（12）United States Patent
Baumgartner et al.

(10) Patent No.: US 11,526,139 B1
(45) Date of Patent: Dec. 13, 2022

(54) CENTRAL PLANT OPTIMIZATION SYSTEM WITH EQUIPMENT MODEL ADAPTATION

(71) Applicant: Johnson Controls Tyco IP Holdings LLP, Milwaukee, WI (US)

(72) Inventors: Ryan A. Baumgartner, Milwaukee, WI (US); Ryan C. Beaty, Milwaukee, WI (US); Shawn A. Schlagenhaft, Fond du lac, WI (US); Homero L. Noboa, Waukesha, WI (US); Matthew J. Asmus, Watertown, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/371,561

(22) Filed: Jul. 9, 2021

(51) Int. Cl.
*G05B 13/02* (2006.01)
*G05B 13/04* (2006.01)

(52) U.S. Cl.
CPC .................................. *G05B 13/048* (2013.01)

(58) Field of Classification Search
CPC ............ G05B 23/0283; G05B 23/0294; G06Q 10/20; G06Q 30/0206
See application file for complete search history.

(56) References Cited

U.S. PATENT DOCUMENTS

| | | | |
|---|---|---|---|
| 10,031,535 B2 * | 7/2018 | Rollins | F04D 27/004 |
| 10,345,056 B2 * | 7/2019 | Rollins | F04D 25/08 |
| 10,670,028 B2 * | 6/2020 | Rollins | F28F 27/003 |
| 10,915,094 B2 | 2/2021 | Wenzel et al. | |
| 11,392,095 B2 * | 7/2022 | Fread | G06Q 50/06 |
| 2015/0184550 A1 * | 7/2015 | Wichmann | G05B 13/04 |
| | | | 700/287 |
| 2015/0185716 A1 * | 7/2015 | Wichmann | F02C 9/28 |
| | | | 700/287 |
| 2021/0055698 A1 | 2/2021 | Przybylski et al. | |

* cited by examiner

*Primary Examiner* — John Kwon
(74) *Attorney, Agent, or Firm* — Foley & Lardner LLP

(57) ABSTRACT

A system for controlling a subplant comprising one or more assets includes one or more memory devices having instructions stored thereon that, when executed by one or more processors, cause the one or more processors to perform operations including generating a design curve for a first asset included in the subplant based on an asset model, the design curve comprising a plurality of data points that define an operation of the first asset, obtaining operational data for the first asset, determining a degradation factor for the first asset by comparing the design curve and the operational data, generating an operational curve for the first asset by derating the design curve based on the degradation factor, and operating the subplant based on the operational curve.

20 Claims, 14 Drawing Sheets ined by comparing the design curve and the intermediate curve, wherein the degradation
CENTRAL PLANT OPTIMIZATION SYSTEM WITH EQUIPMENT MODEL ADAPTATION

BACKGROUND

The present disclosure relates generally to modeling building assets, such as for simulating operations of a central plant and/or building equipment.

A central plant may include various types of equipment configured to serve the thermal energy loads of a building or campus (i.e., a system of buildings). For example, a central plant may include heaters, chillers, heat recovery chillers, cooling towers, or other types of equipment configured to provide heating or cooling for the building. A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling to the air. The working fluid then returns to the central plant to receive further heating or cooling and the cycle continues. Similarly, various types of equipment (e.g., heaters, chillers, heat recovery chillers, cooling towers, etc.) may be that provide heating or cooling to a building or site separate from a central plant. For example, many buildings have some form of HVAC equipment operating to affect indoor air temperatures and/or quality for the building.

A control system for a central plant can include models of central plant assets (e.g., equipment, spaces, etc.) for simulating and/or optimizing central plant operations. For example, the control system can perform optimizations of asset modes to determine setpoints, on/off decisions, or any other control decision. It is desirable to ensure that asset models are updated to reflect changes to corresponding assets, thus ensuring that the optimizations performed by the control system yield accurate outputs (e.g., predictions, control decisions, etc.).

SUMMARY

One implementation of the present disclosure is a system for controlling a subplant including one or more assets. The system includes one or more memory devices having instructions stored thereon that, when executed by one or more processors, cause the one or more processors to perform operations including generating a design curve for a first asset included in the subplant based on an asset model, the design curve including a plurality of data points that define an operation of the first asset, obtaining operational data for the first asset, determining a degradation factor for the first asset by comparing the design curve and the operational data, generating an operational curve for the first asset by derating the design curve based on the degradation factor, and operating the subplant based on the operational curve.

In some embodiments, the operations further including generating an intermediate curve for the first asset based on the operational data, wherein the degradation factor is determined by comparing the design curve and the intermediate curve.

In some embodiments, determining the degradation factor includes calculating an average deviance between the design curve and the intermediate curve, wherein the degradation factor is represented as a percent difference between the design curve and the intermediate curve based on the average deviance.

In some embodiments, the operations further including determining one or more operating setpoints for the subplant based on the operational curve, wherein operating the subplant based on the operational curve includes operating the subplant according to the one or more operating setpoints.

In some embodiments, the design curve for the first asset is a first design curve, the operations further including obtaining a second design curve for the subplant associated with the first asset, wherein determining the degradation factor for the first asset further includes comparing the first design curve, the operational data, and the second design curve.

In some embodiments, the operations further including filtering the operational data by removing any data points that fall outside of a threshold range.

In some embodiments, the design curve defines a relationship between an amount a first resource produced by the first asset and an amount of a second resource consumed by the first asset.

In some embodiments, the first asset is at least one of a chiller, a cooling tower, a boiler, a heater, a steam generator, an air handling unit, or a rooftop unit.

Another implementation of the present disclosure is a method for controlling a subplant including one or more assets. The method includes generating a design curve for a first asset included in the subplant based on a model of the first asset, the design curve including a plurality of operating points that define an operation of the first asset, obtaining operational data for the first asset, determining a degradation factor for the first asset by comparing the design curve and the operational data, generating an operational curve for the first asset by derating the design curve based on the degradation factor, and operating the subplant based on the operational curve.

In some embodiments, the method further includes generating an intermediate curve for the first asset based on the operational data, wherein the degradation factor is determined by comparing the design curve and the intermediate curve.

In some embodiments, determining the degradation factor includes calculating an average deviance between the design curve and the intermediate curve, wherein the degradation factor is represented as a percent difference between the design curve and the intermediate curve based on the average deviance.

In some embodiments, the method further includes determining one or more operating setpoints for the subplant based on the operational curve, wherein operating the subplant based on the operational curve includes operating the subplant according to the one or more operating setpoints.

In some embodiments, the design curve for the first asset is a first design curve, the method further including obtaining a second design curve for the subplant associated with the first asset, wherein determining the degradation factor for the first asset further includes comparing the first design curve, the operational data, and the second design curve.

In some embodiments, the method further includes filtering the operational data by removing any data points that fall outside of a threshold range.

In some embodiments, the design curve defines a relationship between an amount a first resource produced by the first asset and an amount of a second resource consumed by the first asset.

In some embodiments, the first asset is at least one of a chiller, a cooling tower, a boiler, a heater, a steam generator, an air handling unit, or a rooftop unit.

Yet another implementation of the present disclosure is a non-transitory computer-readable medium including instructions stored thereon that, when executed by one or more processors, perform operations including obtaining operating data for a first asset included in the subplant, obtaining a design curve of the subplant, the design curve including a plurality of operating points that define an operation of the subplant, determining a degradation factor for the first asset by comparing the operating data and the design curve, generating an operational curve for the first asset by derating the design curve based on the degradation factor, and operating the subplant based on the operational curve.

In some embodiments, the operations further including generating an intermediate curve of the first asset based on the operational data, wherein the degradation factor is determined by comparing the intermediate curve and the design curve.

In some embodiments, the operations further including determining one or more operating setpoints for the subplant based on the operational curve, wherein operating the subplant based on the operational curve includes operating the subplant according to the one or more operating setpoints.

In some embodiments, the operations further including filtering the operational data by removing any data points that fall outside of a threshold range.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
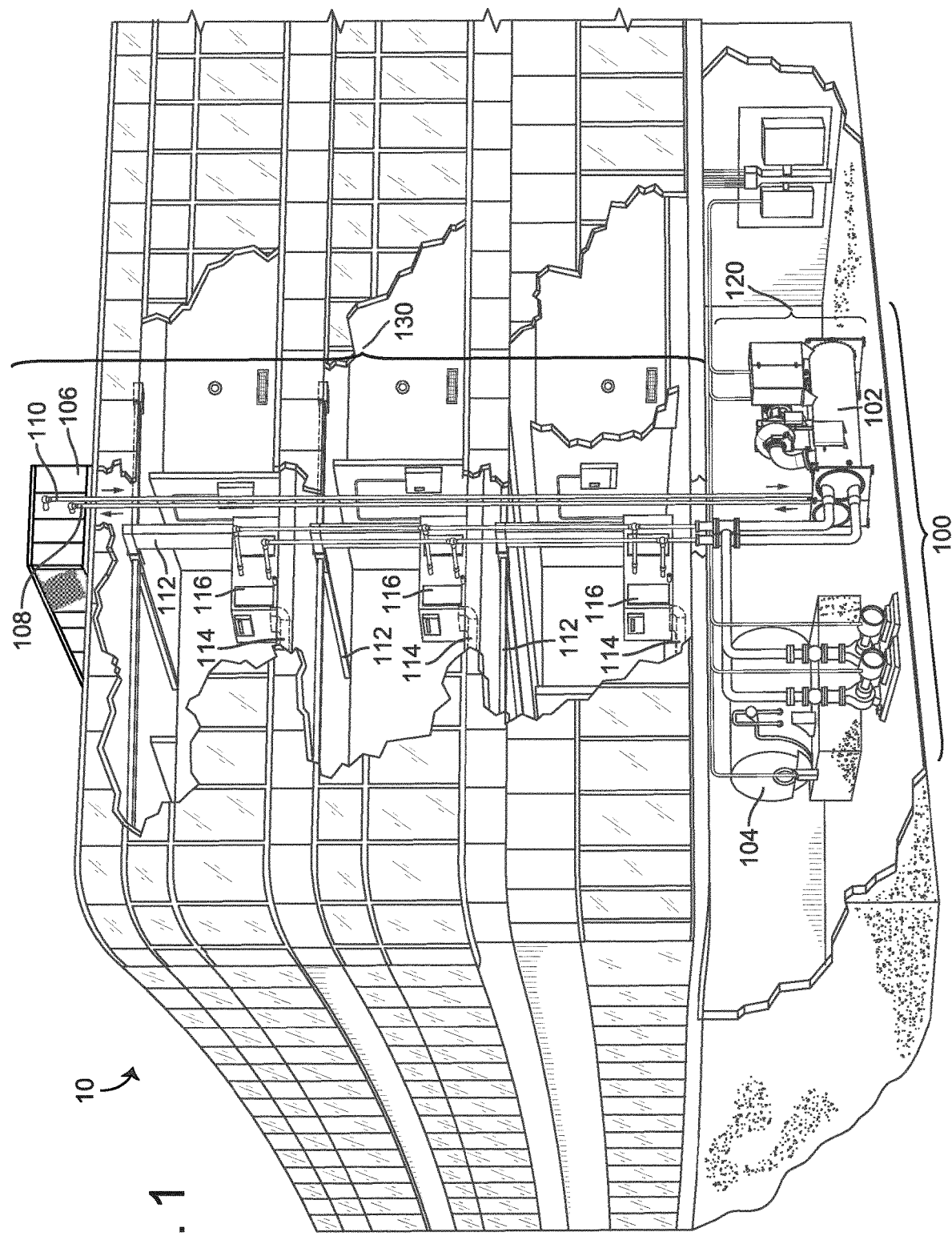
FIG. 1 is a drawing of a building equipped with a HVAC system, according to some embodiments.

Referring generally to the FIGURES, systems and methods for asset model adaptation are shown, according to some embodiments. More specifically, with the systems and methods described herein, asset models can be regularly or continuously updated based on operational data to ensure that the asset models accurately reflect changes to the efficiency or other parameters of corresponding central plant assets. Central plant assets, as described herein, include any equipment, space, etc. in a central plant or other facility. In some cases, central plant assets include at least the equipment designed to affect an indoor air quality of a building. For example, central plant assets can include HVAC equipment (e.g., heaters, chillers, air handling units, pumps, fans, thermal energy storage, etc.) configured to provide heating, cooling, ventilation, or other services for a building.

In some embodiments, central plant assets are configured to serve the thermal energy loads of a building or campus (i.e., a system of buildings). For example, a central plant may include heaters, chillers, heat recovery chillers, cooling towers, or other types of equipment configured to provide heating or cooling for the building or campus. The central plant equipment may be divided into various groups configured to perform a particular function. Such groups of central plant equipment are referred to herein as subplants. For example, a central plant may include a heater subplant, a chiller subplant, a heat recovery chiller subplant, a cold thermal energy storage subplant, a hot thermal energy storage subplant, etc. The subplants may consume resources from one or more utilities (e.g., water, electricity, natural gas, etc.) to serve the energy loads of the building or campus.

In some embodiments, central plant operations are optimized to meet various demands, such as chiller water loads, hot water loads, steam loads, electrical loads, etc., while minimizing the cost and energy required to meet these loads. In some embodiments, a central plant controller includes components to perform such optimizations, including a high level optimizer and a low level optimizer, during operations of the central plant and/or in real time. The central plant controller may predict what the aforementioned loads will be in the future. In particular, the high level optimizer determines what subsystems (chillers, heat recovery chillers, cooling towers, boilers, heat exchanges, etc.) to run to meet those loads at the most optimal cost. The low level optimizer determines (e.g., within each subsystem) what equipment will run and what percentage of full load to minimize energy consumption.

In some embodiments, these optimizations are performed using central plant asset models, which are representations of central plant assets. For example, a central plant asset model can be a mathematical representation of the operations of a central plant asset, such as a particular piece of equipment (e.g., a chiller). Over time, central plant assets can derate due to a number of different factors. For example, components of the asset may wear or, in the case of a chiller, derating may be caused the glycol concentration, ambient temperature, temperature set point, elevation, etc. Derating may affect the efficiency of the asset; for example, the effective tonnage of a chiller may be slightly or significantly lower than expected due to any of these or other factors. Accordingly, the systems and methods described herein can regularly, continuously, or at least occasionally update (i.e., modify) central plant asset models based on real-world (i.e., operational) data to account for derating, thereby ensuring accurate predictions and control decisions for operating the central plant.

While the present disclosure discusses various features in relation to central plants, it should be understood that the features of the present disclosure can also be used in relation to building equipment that is not necessarily located in or a part of a central plant of a building. For example, one or more pieces of building equipment (e.g., chillers) may be located outside of or otherwise not be a part of a central plant of a building, and the features of the present disclosure may be used for such building equipment. All such modifications are contemplated within the scope of the present disclosure.

Building and HVAC System

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
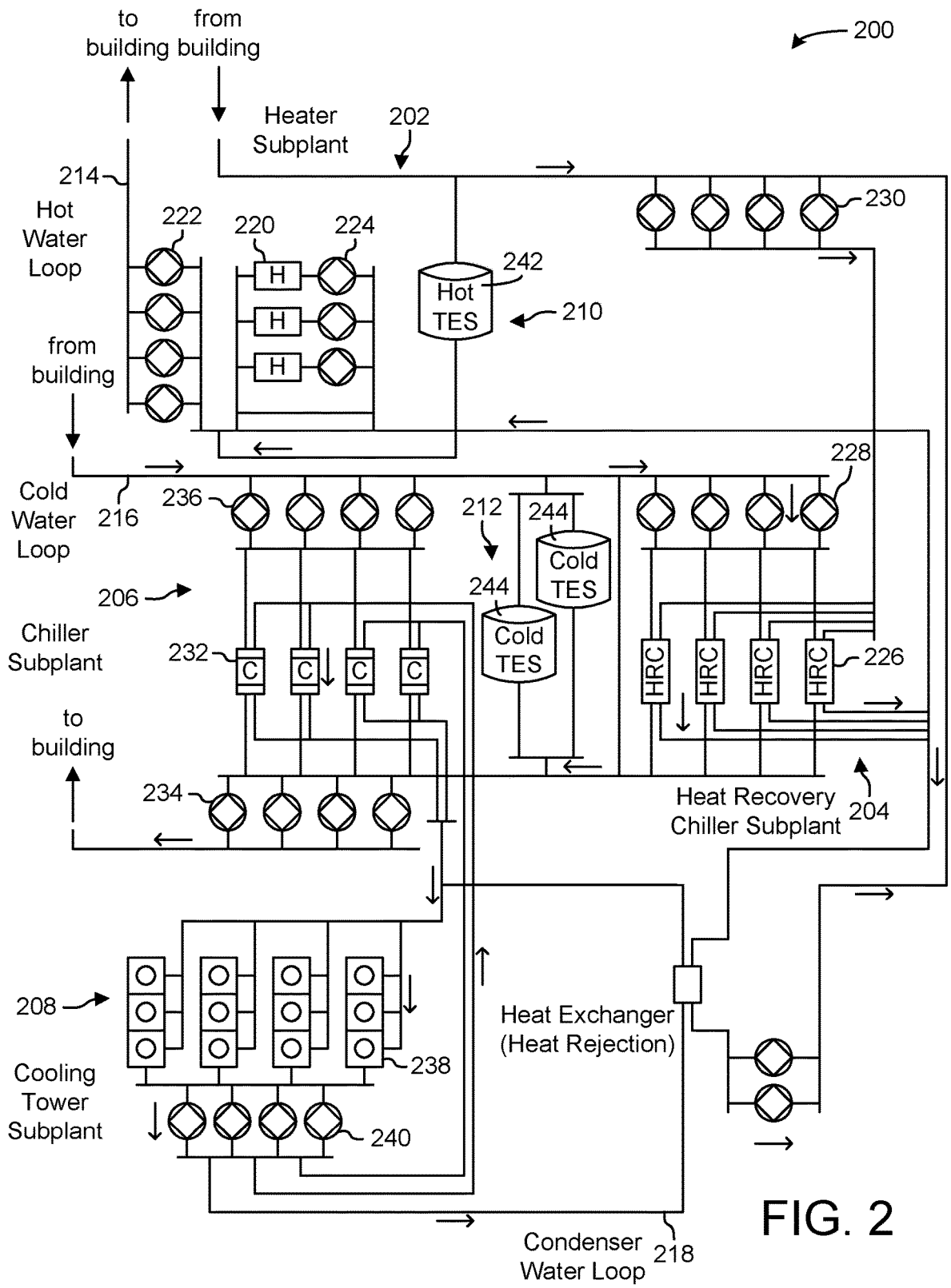
FIG. 2 is a block diagram of a central plant which can be used to serve the energy loads of the building of FIG. 1, according to some embodiments.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, CO2, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Airside System

Figure 3:
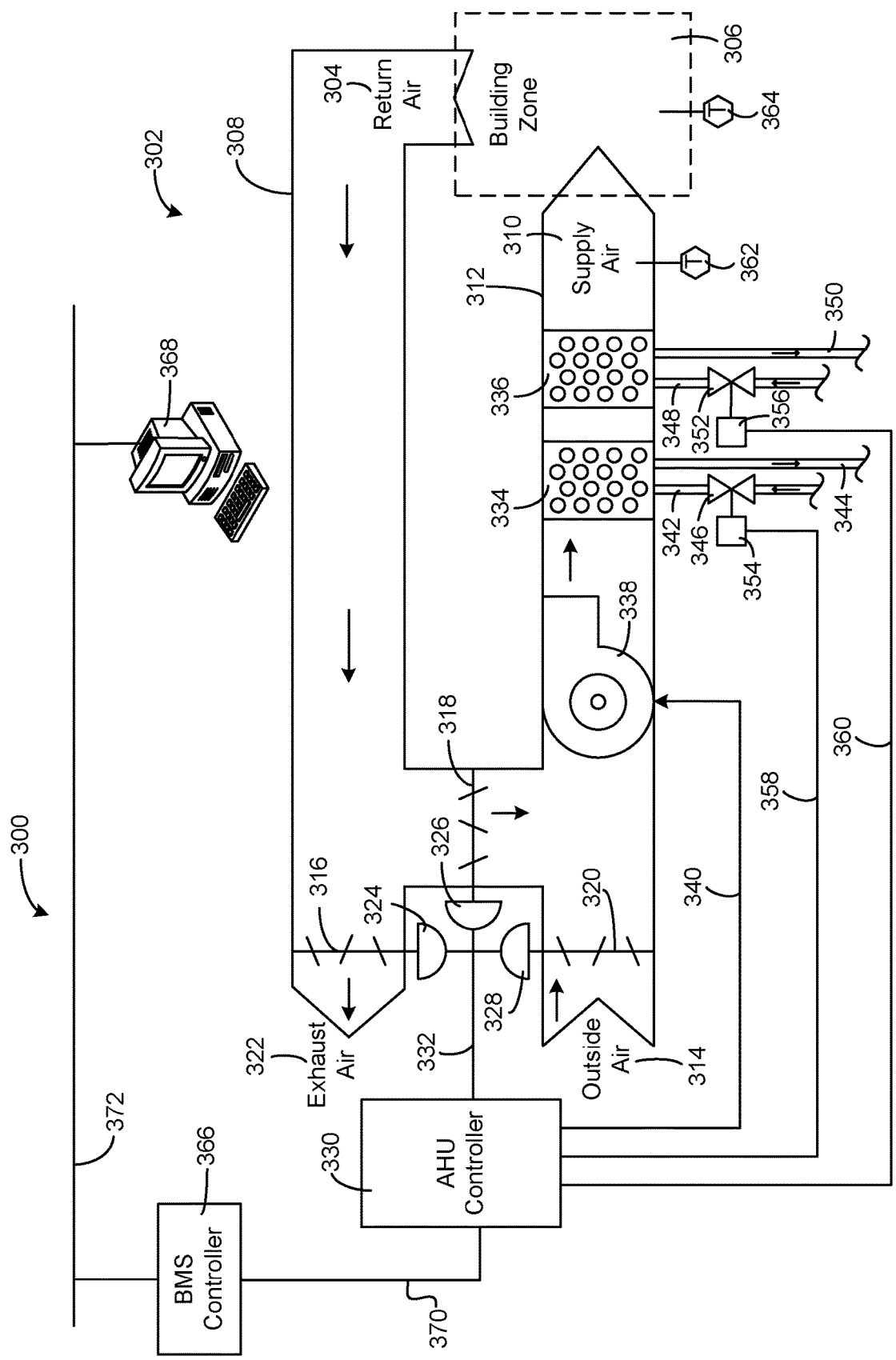
FIG. 3 is a block diagram of an airside system which can be implemented in the building of FIG. 1 and as part of the central plant of FIG. 2, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200 (e.g., from hot water loop 214) via piping 348 and may return the heated fluid to central plant 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Central Plant Controller

Figure 4:
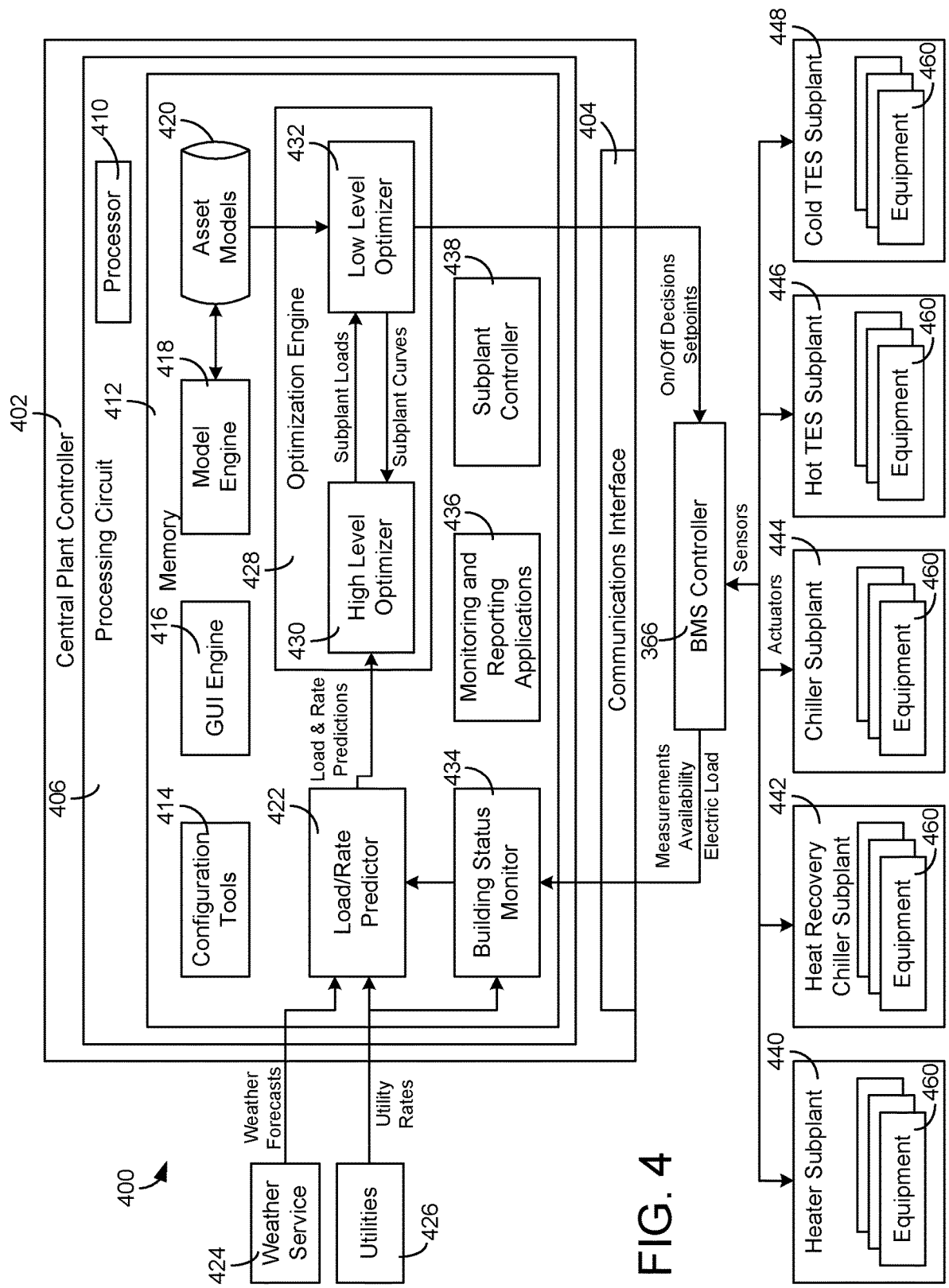
FIG. 4 is a block diagram illustrating a central plant system including a central plant controller that may be used to control the central plant of FIG. 2, according to an exemplary embodiment.

Referring now to FIG. 4, a block diagram illustrating a central plant system 400 is shown, according to some embodiments. System 400 is shown to include a central plant controller 402, BMS controller 366, and a plurality of subplants 440-448. Subplants 440-448 may be the same as any of the subplants or subsystems previously described with reference to FIGS. 1-3. For example, subplants 440-448 are shown to include a heater subplant 440, a heat recovery chiller subplant 442, a chiller subplant 444, a hot TES subplant 446, and a cold TES subplant 448.

Each of subplants 440-448 is shown to include equipment 460 that can be controlled by central plant controller 402 and/or BMS controller 366 to optimize the performance of central plant 200. Equipment 460 may include, for example, heating elements 220, chillers 232, heat recovery heat exchangers 226, cooling towers 238, thermal energy storage devices 242 and 244, pumps 222, 230, and 240, valves 224, 228, 234, and 236, and/or other devices of subplants 440-448. Individual devices of equipment 460 can be turned on or off to adjust the thermal energy load served by each of subplants 440-448. In some embodiments, individual devices of equipment 460 can be operated at variable capacities (e.g., operating a chiller at 10% capacity or 60% capacity) according to an operating setpoint received from central plant controller 402.

In some embodiments, one or more of subplants 440-448 includes a subplant level controller configured to control the equipment 460 of the corresponding subplant. For example, central plant controller 402 may determine an on/off configuration and global operating setpoints for equipment 460. In response to the on/off configuration and received global operating setpoints, the subplant controllers may turn individual devices of equipment 460 on or off, and implement specific operating setpoints (e.g., damper position, vane position, fan speed, pump speed, etc.) to reach or maintain the global operating setpoints.

BMS controller 366 may be configured to monitor conditions within a controlled building or building zone. For example, BMS controller 366 may receive input from various sensors (e.g., temperature sensors, humidity sensors, airflow sensors, voltage sensors, etc.) distributed throughout the building and may report building conditions to central plant controller 402. Building conditions may include, for example, a temperature of the building or a zone of the building, a power consumption (e.g., electric load) of the building, a state of one or more actuators configured to affect a controlled state within the building, or other types of information relating to the controlled building. BMS controller 366 may operate subplants 440-448 to affect the monitored conditions within the building and to serve the thermal energy loads of the building.

BMS controller 366 may receive control signals from central plant controller 402 specifying on/off states and/or setpoints for equipment 460. BMS controller 366 may control equipment 460 (e.g., via actuators, power relays, etc.) in accordance with the control signals provided by central plant controller 402. For example, BMS controller 366 may operate equipment 460 using closed loop control to achieve the setpoints specified by central plant controller 402. In various embodiments, BMS controller 366 may be combined with central plant controller 402 or may be part of a separate building management system. According to an exemplary embodiment, BMS controller 366 is a METASYS® brand building management system, as sold by Johnson Controls, Inc.

Central plant controller 402 may monitor the status of the controlled building using information received from BMS controller 366. Central plant controller 402 may be configured to predict the thermal energy loads (e.g., heating loads, cooling loads, etc.) of the building for plurality of time steps in a prediction window (e.g., using weather forecasts from a weather service). Central plant controller 402 may generate on/off decisions and/or setpoints for equipment 460 to minimize the cost of energy consumed by subplants 440-448 to serve the predicted heating and/or cooling loads for the duration of the prediction window. According to an exemplary embodiment, central plant controller 402 is integrated within a single computer (e.g., one server, one housing, etc.). In various other exemplary embodiments, central plant controller 402 can be distributed across multiple servers or computers (e.g., that can exist in distributed locations). In another exemplary embodiment, central plant controller 402 may be integrated with a smart building manager that manages multiple building systems and/or combined with BMS controller 366.

Central plant controller 402 is shown to include a communications interface 404 and a processing circuit 406. Communications interface 404 may include wired or wireless interfaces (e.g., jacks, antennas, transmitters, receivers, transceivers, wire terminals, etc.) for conducting data communications with various systems, devices, or networks. For example, communications interface 404 may include an Ethernet card and port for sending and receiving data via an Ethernet-based communications network and/or a WiFi transceiver for communicating via a wireless communications network. Communications interface 404 may be configured to communicate via local area networks or wide area networks (e.g., the Internet, a building WAN, etc.) and may use a variety of communications protocols (e.g., BACnet, IP, LON, etc.).

Communications interface 404 may be a network interface configured to facilitate electronic data communication between central plant controller 402 and various external systems or devices (e.g., BMS controller 366, subplants 440-448, etc.). For example, central plant controller 402 may receive information from BMS controller 366 indicating one or more measured states of the controlled building (e.g., temperature, humidity, electric loads, etc.) and one or more states of subplants 440-448 (e.g., equipment status, power consumption, equipment availability, etc.). Communications interface 404 may receive inputs from BMS controller 366 and/or subplants 440-448 and may provide operating parameters (e.g., on/off decisions, setpoints, etc.) to subplants 440-448 via BMS controller 366. The operating parameters may cause subplants 440-448 to activate, deactivate, or adjust a setpoint for various devices of equipment 460.

Still referring to FIG. 4, processing circuit 406 is shown to include a processor 410 and memory 412. Processor 410 may be a general purpose or specific purpose processor, an application specific integrated circuit (ASIC), one or more field programmable gate arrays (FPGAs), a group of processing components, or other suitable processing components. Processor 410 may be configured to execute computer code or instructions stored in memory 412 or received from other computer readable media (e.g., CDROM, network storage, a remote server, etc.).

Memory 412 may include one or more devices (e.g., memory units, memory devices, storage devices, etc.) for storing data and/or computer code for completing and/or facilitating the various processes described in the present disclosure. Memory 412 may include random access memory (RAM), read-only memory (ROM), hard drive storage, temporary storage, non-volatile memory, flash memory, optical memory, or any other suitable memory for storing software objects and/or computer instructions. Memory 412 may include database components, object code components, script components, or any other type of information structure for supporting the various activities and information structures described in the present disclosure. Memory 412 may be communicably connected to processor 410 via processing circuit 406 and may include computer code for executing (e.g., by processor 410) one or more processes described herein.

Memory 412 is also shown to include configuration tools 414. Configuration tools 414 can allow a user to define (e.g., via graphical user interfaces, via prompt-driven "wizards," etc.) how central plant controller 402 should react to changing conditions in the central plant subsystems. In an exemplary embodiment, configuration tools 414 allow a user to build and store condition-response scenarios that can cross multiple central plant devices, multiple building systems, and multiple enterprise control applications (e.g., work order management system applications, entity resource planning applications, etc.). For example, configuration tools 414 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudocode constructs or complex programming language functions (allowing for more complex interactions, conditional statements, loops, etc.). Configuration tools 414 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Memory 412 is shown to include one or more GUI servers, web services, or GUI engines 416 to support monitoring and reporting applications 436. In some embodiments, web services, as described herein, are implemented via GUI engines 416. In various embodiments, applications 436, web services, and GUI engine 416 may be provided as separate components outside of central plant controller 402 (e.g., as part of a smart building manager). Central plant controller 402 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 402 may be configured to provide the results of any such processing to other databases, tables, XML files, or other data structures for further querying, calculation, or access by, for example, external monitoring and reporting applications.

Still referring to FIG. 4, memory 412 is shown to include a building status monitor 434. Central plant controller 402 may receive data regarding the overall building or building space to be heated or cooled with central plant 200 via building status monitor 434. In an exemplary embodiment, building status monitor 434 may include a graphical user interface component configured to provide graphical user interfaces to a user for selecting building requirements (e.g., overall temperature parameters, selecting schedules for the building, selecting different temperature levels for different building zones, etc.).

Central plant controller 402 may determine on/off configurations and operating setpoints to satisfy the building requirements received from building status monitor 434. In some embodiments, building status monitor 434 receives, collects, stores, and/or transmits cooling load requirements, building temperature setpoints, occupancy data, weather data, energy data, schedule data, and other building parameters. In some embodiments, building status monitor 434 stores data regarding energy costs, such as pricing information available from utilities 426 (energy charge, demand charge, etc.).

Still referring to FIG. 4, memory 412 is shown to include a load/rate predictor 422. Load/rate predictor 422 may be configured to predict the thermal energy loads ($\hat{\ell}_k$) of the building or campus for each time step k (e.g., k=1 ... n) of an optimization period. Load/rate predictor 422 is shown receiving weather forecasts from a weather service 424. In some embodiments, load/rate predictor 422 predicts the thermal energy loads $\hat{\ell}_k$ as a function of the weather forecasts. In some embodiments, load/rate predictor 422 uses feedback from BMS controller 366 to predict loads $\hat{\ell}_k$. Feedback from BMS controller 366 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 422 receives a measured electric load and/or previous measured load data from BMS controller 366 (e.g., via building status monitor 434). Load/rate predictor 422 may predict loads $\hat{\ell}_k$ as a function of a given weather forecast ($\hat{\phi}_w$), a day type (day), the time of day (t), and previous measured load data ($Y_{k-1}$). Such a relationship is expressed in the following equation:

$$\hat{\ell}_k = f(\hat{\phi}_w, \text{day}, t | Y_{k-1})$$

In some embodiments, load/rate predictor 422 uses a deterministic plus stochastic model trained from historical load data to predict loads $\hat{\ell}_k$. Load/rate predictor 422 may use any of a variety of prediction methods to predict loads $\hat{\ell}_k$ (e.g., linear regression for the deterministic portion and an AR model for the stochastic portion). Load/rate predictor 422 may predict one or more different types of loads for the building or campus. For example, load/rate predictor 422 may predict a hot water load $\hat{\ell}_{Hot,k}$ and a cold water load $\hat{\ell}_{Cold,k}$ for each time step k within the prediction window.

Load/rate predictor 422 is shown receiving utility rates from utilities 426. Utility rates may indicate a cost or price per unit of a resource (e.g., electricity, natural gas, water, etc.) provided by utilities 426 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 426 or predicted utility rates estimated by load/rate predictor 422.

In some embodiments, the utility rates include demand charges for one or more resources provided by utilities 426. A demand charge may define a separate cost imposed by utilities 426 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, optimization engine 428 may be configured to account for demand charges in the high level optimization process performed by high level optimizer 430. Utilities 426 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Load/rate predictor 422 may store the predicted loads $\hat{\ell}_k$ and the utility rates in memory 412 and/or provide the predicted loads $\hat{\ell}_k$ and the utility rates to optimization engine 428. Optimization engine 428 may use the predicted loads $\hat{\ell}_k$ and the utility rates to determine an optimal load distribution for subplants 440-448 and to generate on/off decisions and setpoints for equipment 460.

Still referring to FIG. 4, memory 412 is shown to include an optimization engine 428. Optimization engine 428 may perform a cascaded optimization process to optimize the performance of central plant 200. For example, optimization engine 428 may use building loads and utility rates to determine an optimal subplant load distribution to minimize cost over a simulation period. In some embodiments, as shown, optimization engine is configured to determine equipment on/off decisions and operating setpoints, which can then be used to control building equipment. In other embodiments, optimization engine 428 may also be implemented via a BMS controller (e.g., BMS controller 366) to simulate operations of the BMS and equipment associated with the BMS.

As shown, optimization engine 428 includes a high level optimizer 430 and a low level optimizer 432. High level optimizer 430 may control an outer (e.g., subplant level) loop of the cascaded optimization. High level optimizer 430 may determine an optimal distribution of thermal energy loads across subplants 440-448 for each time step in the prediction window in order to optimize (e.g., minimize) the cost of energy consumed by subplants 440-448. Various other features of high level optimizer 430 are described in greater detail in U.S. patent application Ser. No. 16/214,984, filed Dec. 12, 2018, and incorporated herein by reference in its entirety.

High level optimizer 430 may receive planned loads and utility rates for the entire simulation period. The planned loads and utility rates may be defined by input received from a user via a client device 522 (e.g., user-defined, user selected, etc.) and/or retrieved from a plan information database 526. High level optimizer 430 uses the planned loads and utility rates in conjunction with subplant curves from low level optimizer 432 to determine optimal subplant loads (i.e., an optimal dispatch schedule) for a portion of the simulation period.

The portion of the simulation period over which high level optimizer 430 optimizes the subplant loads may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 430 requests all of the subplant curves used in the simulation from low level optimizer 432 at the beginning of the simulation. Since the planned loads and environmental conditions are known for the entire simulation period, high level optimizer 430 may retrieve all of the relevant subplant curves at the beginning of the simulation. In some embodiments, low level optimizer 432 generates functions that map subplant production to equipment level production and resource use when the subplant curves are provided to high level optimizer 430. These subplant to equipment functions may be used to calculate the individual equipment production and resource use (e.g., in a post-processing module) based on the results of the simulation.

Low level optimizer 432 may control an inner (e.g., equipment level) loop of the cascaded optimization. Low level optimizer 432 may determine how to best run each subplant at the load setpoint determined by high level optimizer 430. For example, low level optimizer 432 may determine on/off states and/or operating setpoints for various devices of equipment 460 in order to optimize (e.g., minimize) the energy consumption of each subplant while meeting the thermal energy load setpoint for the subplant.

In some embodiments, low level optimizer 432 generates and provides subplant curves to high level optimizer 430. Each subplant curve may indicate an amount of resource consumption by a particular subplant (e.g., electricity use measured in kW, water use measured in L/s, etc.) as a function of the subplant load. In some embodiments, low level optimizer 432 generates the subplant curves by running the low level optimization process for various combinations of subplant loads and weather conditions to generate multiple data points. Low level optimizer 432 may fit a curve to the data points to generate the subplant curves. In other embodiments, low level optimizer 432 provides data points to high level optimizer 430 and high level optimizer 430 generates the subplant curves using the data points. High level optimizer 430 may store the subplant curves in memory for use in the high level (i.e., asset allocation) optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

In some embodiments, device efficiency curves may be stored as asset models 420. In other embodiments, asset models 420 are used to generate design curves. In either case, low level optimizer 432 receives or retrieves models of central plant assets from a database, shown as asset models 420. As described herein, a central plant asset, or more simply an "asset," refers to any type of entity that is monitored, controlled, or included in a central plant. For example, assets can include equipment (e.g., devices, sensors, user interfaces, etc.), spaces (e.g., rooms, floors, buildings, etc.), or any other component. Accordingly, asset models 420 can include any model that represents a particular central plant or building asset (e.g., any of equipment 460 or any of the building devices described with respect to FIGS. 1-4). For example, asset models 420 may include models that represent one or more chillers of chillers 232, heat recovery heat exchangers 226, heating elements 220, etc. In some embodiments, these asset models 420 are mathematical representations of an asset, and executing a model according to a set of parameters may simulate operation of the corresponding asset. In some embodiments, these asset models 420 are the device efficiency curves discussed above. In other words, asset models 420 can include one or more curves that define a relationship between a consumed resource (e.g., electricity, water, etc.) and a produced resource (e.g., chilled water, heated air, etc.). Thus, asset models 420 can be used to predict operating parameters for a corresponding asset. As an example, asset models 420 may be executed to predict a future resource consumption for an asset.

A model engine 418 may be configured to generate and/or modify asset models 420. More specifically, model engine 418 may be configured to generate new asset models 420 based on available operating data, which can be collected from equipment over time, or based on known equipment parameters. For example, an asset model can be established based on manufacturer define parameters (e.g., capacity, power consumption, etc.) and/or can be based on experimental or simulated data (e.g., by operating a sample of the asset). In some embodiments, as will be described below in greater detail, model engine 418 is configured to update or modify asset models 420 based on operational data, in order to ensure model accuracy over time. For example, an asset (e.g., a chiller) may derate or operate less efficiently over time due to component wear, mineral buildup, etc., and model engine 418 can adjust asset models 420 to account for this type of derating.

Memory 412 is also shown to include a subplant controller 438. Subplant controller 438 may store historical data regarding past operating statuses, past operating setpoints, and instructions for calculating and/or implementing control parameters for subplants 440-448. Subplant controller 438 may also receive, store, and/or transmit data regarding the conditions of individual devices of equipment 460, such as operating efficiency, equipment degradation, a date since last service, a lifespan parameter, a condition grade, or other device-specific data. Subplant controller 438 may receive data from subplants 440-448 and/or BMS controller 366 via communications interface 404. Subplant controller 438 may also receive and store on/off statuses and operating setpoints from low level optimizer 432.

Data and processing results from optimization engine 428, subplant controller 438, or other modules of central plant controller 402 may be accessed by (or pushed to) monitoring and reporting applications 436. Monitoring and reporting applications 436 may be configured to generate real time "system health" dashboards that can be viewed and navigated by a user (e.g., a central plant engineer). For example, monitoring and reporting applications 436 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

Subplant Modeling

As described above, high level central plant optimization determines what subsystems or equipment (e.g., chillers, heat recovery chillers, cooling towers, boilers, heat exchangers, etc.) to run to meet various central plant loads (e.g., chilled or hot water loads, steam loads, electrical loads, etc.) at a lowest cost or a lowest energy consumption. Low level central plant optimization can be used to determine, for each subsystem or for a set of equipment, the particular equipment that should run, and the parameters that the particular equipment should run at, to meet these central plant loads. Accordingly, accurate asset and/or subplant models are crucial to ensuring that central plant operations can be optimized by high level optimizer 430 and low level optimizer 432.

It will be appreciate that the high and low level optimizations described herein are not limited to central plants, but may also be implemented in other systems, such as a BMS, to optimize operations of any sort of building equipment. Further, while the present disclosure describes the optimization as being bifurcated between low and high level optimization portions, it should be understood that, in some implementations, the features described as high level and low level optimization features may be performed by the same system/subsystem or by different systems/subsystems.

Figure 5:
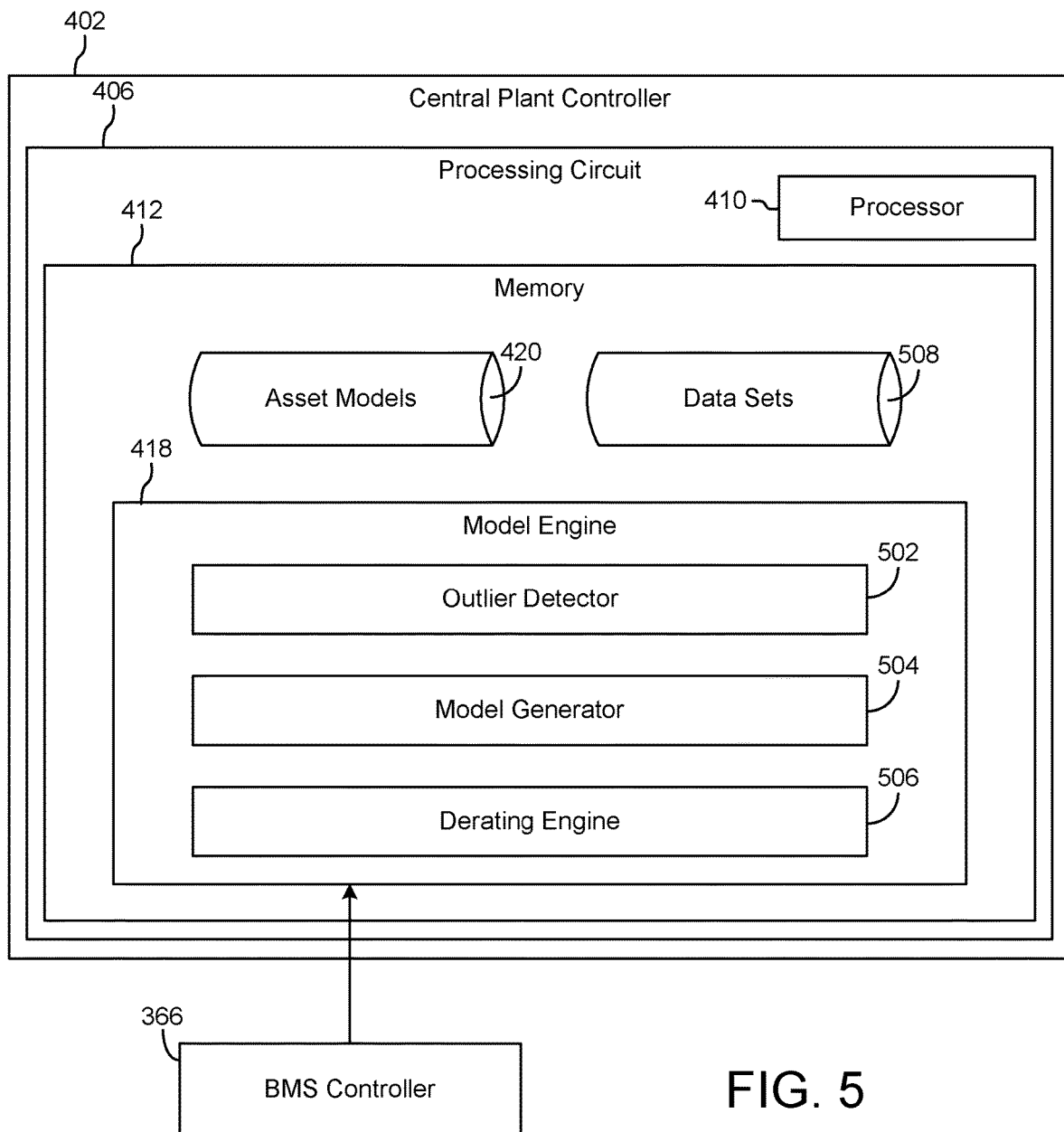
FIG. 5 is a block diagram of the central plant controller of FIG. 4 in greater detail, according to some embodiments.

Referring now to FIG. 5, a more detailed block diagram of central plant controller 402 focusing on model engine 418 is shown, according to some embodiments. As described above, model engine 418 can be configured to generate new asset models 420 and can update (i.e., modify) asset models 420 based on operational data, such as to adjust asset models 420 to account for equipment derating over time. In this manner, low level optimizer 432 can utilize the most up-to-date asset models 420 to ensure accurate predictions and optimizations.

As briefly described above, asset models 420 can include any model that represents a particular central plant or building asset, such as chillers 232, heat recovery heat exchangers 226, heating elements 220, etc. In some embodiments, asset models 420 include models that are generated based on real-world (i.e., operational) data or experimental data. Additionally, asset models 420 can be constructed from manufacturer data (e.g., boilerplate information such as capacity, power, etc.). In some embodiments, asset models 420 include one or more curves that define a relationship between a resource consumed (e.g., electricity, water, gas, etc.) and a resource produced (e.g., hot water, chilled water, electricity, etc.). One or more of these curves can be combined to represent a subplant or central plant, as described above. In some embodiments, asset models 420 can be utilized by low level optimizer 432 to generate subplant curves, as also discussed above and as described in greater detail below with respect to FIGS. 8A-8F.

In some embodiments, asset models 420 include a modified Gordon-Ng model that mathematically represents operations of a chiller asset (e.g., chillers 232). This modified Gordon-Ng model can be utilized to calculate the energy consumption of a single chiller of the central plant based on output temperatures for an evaporator and a condenser of a target chiller. In particular, this model may represent the operations of a water-cooled chiller. The modified Gordon-Ng model is defined as:

$$\left(\frac{1}{COP}+1\right)\frac{T_{CHW,Out}}{T_{CW,Out}}-1=$$

$$c_1\frac{T_{CHW,Out}}{\dot{Q}_{evap}}+c_2\frac{(T_{CW,Out}-T_{CHW,Out})}{T_{CW,Out}\dot{Q}_{evap}}+c_3\frac{\left(\frac{1}{COP}+1\right)\dot{Q}_{evap}}{T_{CW,Out}}$$

where COP is the coefficient of performance, $T_{CHW,Out}$ is the leaving evaporator water temperature, $T_{CW,Out}$ is the leaving condenser water temperature, $\dot{Q}_{evap}$ is the heat transfer quantity in the evaporator. It will be appreciated, however, that asset models 420 may include a variation of this modified Gordon-Ng model where $T_{CHW,Out}$ is substituted for $T_{CHW,IN}$, or the input evaporator water temperature, and $T_{CW,Out}$ is substituted for $T_{CW,IN}$, or the input condenser water temperature. In other words, the modified Gordon-Ng model described herein may utilize either input or output temperatures for the evaporator and condenser of a chiller.

In this example, the modified Gordon-Ng model has three coefficients $c_1$, $c_2$, $c_3$ that are solved by regression. In some embodiments, the modified Gordon-Ng model can be rewritten to solve for power, where:

$$P = \dot{Q}_{evap} \left[ \frac{(T_{CW,Out} - T_{CHW,Out}) + c_1 \frac{T_{CHW,Out} T_{CW,Out}}{\dot{Q}_{evap}} + c_2 \frac{(T_{CW,Out} - T_{CHW,Out})}{\dot{Q}_{evap}} + c_3 \dot{Q}_{evap}}{T_{CHW,Out} - c_3 \dot{Q}_{evap}} \right]$$

Substituting $a_1$, $a_2$, $a_3$, $a_4$ yields:

$$P = \dot{Q}_{evap} \left[ \frac{a_1 + a_2 + a_3 + a_4}{b_1} \right], \text{ where}$$

$a_1 = T_{CW,Out} - T_{CHW,Out}$, $a_2 = \frac{T_{CHW,Out} T_{CW,Out}}{\dot{Q}_{evap}}$, $a_3 = \frac{(T_{CW,Out} - T_{CHW,Out})}{\dot{Q}_{evap}}$, $a_4 = \dot{Q}_{evap}$, and $b_1 = T_{CHW,Out} - c_3 \dot{Q}_{evap}$.

In some embodiments, asset models 420 include a biquadratic model, also representing operations of a chiller asset (e.g., chillers 232). In this regard, the biquadratic model may be an alternative to the Gordon-Ng model presented above. The biquadratic model may use part load ration (PLR) and lift as variables. PLR can be calculated as:

$$PLR = \frac{Q_{evap}}{Q_{design}}$$

where $Q_{evap}$ is the cooling delivered by the chiller and $Q_{design}$ is the chiller's rated load.

The lift of a chiller is essentially the work that the chiller is doing, and can be calculated as:

LIFT=$(T_{CW,Out} - T_{CHW,Out})$

Alternatively, a lift ratio can be calculated as:

$$\text{LIFT}_{ratio} = \frac{(T_{CW,Out} - T_{CHW,Out})}{(T_{CW,Out,design} - T_{CHW,Out,design})}$$

where $T_{CW,Out}$ is the leaving condenser water temperature, $T_{CHW,Out}$ is the leaving chilled water temperature, $T_{CW,Out,design}$ is the design leaving condenser water temperature, and $T_{CHW,Out,design}$ is the design leaving chilled water temperature.

Solving the biquadratic chiller model for power, P, yields:

$P = c_1 + c_2 \text{PLR} + c_3 \text{LIFT} + c_4 \text{PLR}*\text{LIFT} + c_5 \text{PLR}^2*\text{LIFT} + c_6 \text{PLR}*\text{LIFT}^2 + c_7 \text{PLR}^2*\text{LIFT}^2 + c_8 \text{LIFT}^2 + c_9 \text{PLR}^2$ which can be simplified, in some embodiments, to:

$P = c_1 + c_2 \text{PLR} + c_3 \text{LIFT} + c_4 \text{PLR}*\text{LIFT} + c_5 \text{PLR}^2*\text{LIFT} + c_6 \text{LIFT}^2$ It will also be appreciated that, in some embodiments, the biquadratic chiller model can be solved for power, P, based on $\text{LIFT}_{ratio}$, as shown above. For example, the simplified biquadratic chiller model can be simplified to:

$P = c_1 + c_2 \text{PLR} + c_3 \text{LIFT}_{ratio} + c_4 \text{PLR}*\text{LIFT}_{ratio} + c_5 \text{PLR}^2*\text{LIFT}_{ratio} + c_6 \text{LIFT}_{ratio}^2$ In some embodiments, asset models 420 include a steam-driven chiller model that represents the operations of a steam-driven chiller, in particular. The steam-driven chiller model may be alternate, modified version of the Gordon-Ng model described above. In particular, a first variable corresponding to input steam mass flow rate may be converted into steam power using an additional steam turbine model with two coefficients. The leaving condenser water temperature can also be calculated using an inlet temperature, a cooling load, and the steam power estimate for a particular steam-driven chiller. A power estimate for a steam-driven chiller can be calculated as:

$$\dot{P}_{steam} = \frac{\left(\dot{m}_{steam} - \left(\frac{STc_2}{1000}\right)\right)}{STc_1}$$

where $\dot{m}_{steam}$ is the input steam mass flow and $STc_2$ and $STc_1$ are coefficients for the model. From this equation, heat transfer in a condenser of the steam-driven chiller can be calculated as:

$\dot{Q}_{cond} = \dot{P}_{steam} + \dot{Q}_{evap}$ and the leaving condenser water temperature is calculated as:

$$T_{CW,Out} = T_{CW,In} + \left(\frac{\dot{Q}_{cond}}{\rho c_p}\right)$$

The modified Gordon-Ng model for the steam-driven chiller can then be solved using $\dot{P}_{steam}$ by:

$$\left(\frac{\dot{P}_{steam}}{\dot{Q}_{evap}} + 1\right) \frac{T_{CHW,Out}}{T_{CW,Out}} - 1 =$$

$$c_1 \frac{T_{CHW,Out}}{\dot{Q}_{evap}} + c_2 \frac{(T_{CW,Out} - T_{CHW,Out})}{T_{CW,Out} \dot{Q}_{evap}} + c_3 \frac{\left(\frac{\dot{P}_{steam}}{\dot{Q}_{evap}} + 1\right) \dot{Q}_{evap}}{T_{CW,Out}}$$

In some embodiments, asset models 420 can include a model representing operations of an air-cooled chiller. In such embodiments, the model may be similar to the Gordon-Ng model described above for a water-cooled chiller, with the exception that the leaving condenser water temperature is replaced with entering ambient dry-bulb temperature, $T_{OA,In}$, calculated by:

$$\left(\frac{\dot{P}}{\dot{Q}_{evap}} + 1\right) \frac{T_{CHW,Out}}{T_{OA,In}} - 1 =$$

$$c_1 \frac{T_{CHW,Out}}{\dot{Q}_{evap}} + c_2 \frac{(T_{OA,In} - T_{CHW,Out})}{T_{OA,In} \dot{Q}_{evap}} + c_3 \frac{\left(\frac{\dot{P}}{\dot{Q}_{evap}} + 1\right) \dot{Q}_{evap}}{T_{OA,In}}$$

In some embodiments, asset models 420 can include a model representing operations of a steam absorption chiller. In such embodiments, a non-linear solver is used to fit coefficients for a steam absorption chiller to the model to minimize residuals between predicted and actual coefficient of performance (COP) values. The predicted COP for a steam absorption chiller can be calculated by:

$$COP_{predicted} = \frac{\left(\frac{T_{CHW,Out}}{T_{Steam,In}}\right)}{\left(1 + e^{\left(-c_1\left(\frac{\dot{Q}_{evap}}{\dot{Q}_{design}} + c_2\right)\right)}\right)}$$

The actual COP values are then calculated as:

$$COP_{actual} = \frac{\dot{Q}_{evap}}{\dot{P}_{Steam,In}}$$

and the COP residuals are calculated as:

$$COP_{residuals} = COP_{predicted} - COP_{actual}$$

Once the model coefficients are fit, the steam consumption of the chiller can be predicted by:

$$\dot{P}_{Steam,In} = \frac{\dot{Q}_{evap}\left(1 + e^{\left(-c_1\left(\frac{\dot{Q}_{evap}}{\dot{Q}_{design}} + c_2\right)\right)}\right)}{\left(\frac{T_{CHW,Out}}{T_{Steam,In}}\right)}$$

In some embodiments, asset models 420 can include a model representing operations of a double bundle heat recovery chiller. A double bundle heat recovery chiller includes two "bundles," meaning there are two water loops through the condenser. Energy conservation in a double bundle heat recovery chiller is defined as:

$$\dot{Q}_{cond} = P + \dot{Q}_{evap}$$

In general, one of the water loops is a condenser loop and the other is a hot water loop, so the energy conservation equation can be rewritten as:

$$\dot{Q}_{cond} = \dot{Q}_{CW} + \dot{Q}_{Hw}$$

Substituting the written equation into the original energy conservation equation yields:

$$\dot{Q}_{CW} + \dot{Q}_{HW} = P + \dot{Q}_{evap}$$

In general, double bundle heat recovery chillers are designed for high lift and are intended to produce two hot water outputs in addition to a cold water output. In this regard double bundle heat recovery chillers typically have two modes of operation. The first mode of operation is the same as a heat recovery chiller, where a hot water loop flows and condenser water does not flow. The hot water flow is used for the leaving condenser water temperature in a Gordon-Ng model (e.g., similar to the modified Gordon-Ng model describe above with respect to a water-cooled chiller) as:

$$P = \dot{Q}_{evap}\left[\frac{(T_{HW,Out} - T_{CHW,Out}) + c_1\frac{T_{CHW,Out}T_{HW,Out}}{\dot{Q}_{evap}} + c_2\frac{(T_{HW,Out} - T_{CHW,Out})}{\dot{Q}_{evap}} + c_3\dot{Q}_{evap}}{T_{CHW,Out} - c_3\dot{Q}_{evap}}\right]$$

Substituting $a_1$, $a_2$, $a_3$, $a_4$ yields:

$$P = \dot{Q}_{evap}\left[\frac{a_1 + a_2 + a_3 + a_4}{b_1}\right] \text{where}$$

$a_1 = T_{HW,Out} - T_{CHW,Out}$, $a_2 = \frac{T_{CHW,Out}T_{HW,Out}}{\dot{Q}_{evap}}$, $a_3 = \frac{(T_{HW,Out} - T_{CHW,Out})}{\dot{Q}_{evap}}$, $a_4 = \dot{Q}_{evap}$, and $b_1 = T_{CHW,Out} - c_3\dot{Q}_{evap}$.

In the second mode of operation, both the hot water and the condenser water loops have flow. In this case, a capacity of the condenser is determined by a capacity of each bundle, and a set of nonlinear equations (not shown) can be used to solve for these capacity values.

In some embodiments, asset models 420 includes a heat pump chiller model, representing the operations of a heat pump chiller. In contrast to other types of chillers (e.g., water-cooled chillers), control variables for a heat pump chillers typically include condenser leaving hot water temperature. This type of chiller produces hot water, thereby operating in an opposing manner to a water-cooled chiller that produces cold water controlled to a setpoint. The capacity of an evaporator of a heat pump chiller can be modeled by:

$$\dot{Q}_{evap} = \left[\frac{\frac{(\dot{Q}_{cond}T_{CHW,Out})}{T_{HW,Out}} - c_1 T_{CHW,Out} - c_2\left(1 - \frac{T_{CHW,Out}}{T_{HW,Out}}\right)}{\left(1 + c_3\frac{\dot{Q}_{cond}}{T_{HW,Out}}\right)}\right] \text{where}$$

$a_1 = \frac{(\dot{Q}_{cond}T_{CHW,Out})}{T_{HW,Out}}$, $a_2 = T_{CHW,Out}$, $a_3 = \left(1 - \frac{T_{CHW,Out}}{T_{HW,Out}}\right)$, and $a_4 = \left(1 + c_3\frac{\dot{Q}_{cond}}{T_{HW,Out}}\right)$.

Substituting these $a_1$, $a_2$, $a_3$, and $a_4$ into the original equation yields:

$$\dot{Q}_{evap} = \left[\frac{a_1 - a_2 - a_3}{a_4}\right]$$

where $\dot{Q}_{evap}$ is the capacity of the evaporator. Once the capacity of the evaporator is solved, the power of the heat pump chiller can be defined as:

$$P = \dot{Q}_{cond} - \dot{Q}_{evap}$$

In addition to any of the models described above, it will be appreciated that asset models 420 may include any number of other types of models, representing operations of any of other building assets (e.g., equipment 460) described herein. It will also be appreciated that the models described above represent only a portion of the models that may be include in asset models 420. For example, asset models 420 can also include models that represent other types of assets, such as pumps, heat exchangers, boilers, cooling towers, etc. In some embodiments, asset models 420 can also include models for heat recovery chillers and/or dual compressor chillers.

Still referring to FIG. 5, any of asset models 420 described above can be updated (i.e., modified) by model engine 418 to ensure that each of asset models 420 accurately represent a corresponding asset. Accordingly, operational data may be collected for each asset over time. Operational data, as described herein, can include any data relating to the operation of an asset over time. For example, operational data can include setpoints, schedules, time periods when the asset was on or off, maintenance information, alarm data, etc. In some embodiments, operational data is transmitted to or received by model engine 418, from BMS controller 366; although, it will be appreciated that in other embodiments, operational data may be received from other sources (e.g., directly from building assets, from other controllers or systems, etc.). In some embodiments, operational data is collected over time to generate a historical data set for each asset. For example, operational data may be collected in real or near real-time and stored by BMS controller 366 and/or central plant controller 402. In some such embodiments, central plant controller 402 can store data in a database as data sets 508, where each individual data set or a group of data sets can be associated with each asset.

Model engine 418 is shown to include an outlier detector 502, which is configured to analyze one or more of data sets 508 to detect and, if necessary, remove outliers. Outliers are data points that are different in some way than the rest of the data points in a data set. An outlier may be outside of an upper and/or lower boundary associated with the data set, or an outlier may be an extreme value that does not match an expected range or curve associated with the data sets. For example, data points associated with temperature setpoints for a space in a building may normally fall within the range of 68-72° F., and a data point may be flagged as an outlier if it exceeds this range (e.g., a data point of 60° F. may be an outlier). Outliers may be present in a data set for any number of reasons, such as due to measurement errors (e.g., due to fault sensors), sampling errors (e.g., sampling data at the wrong time), etc.

Outlier detector 502 may implement any number of different techniques for detecting outliers, such as z-score, density-based spatial clustering of applications with noise (DBSCAN), linear regressions, isolation trees, etc. For example, outlier detector 502 may perform a z-score analysis on one of data sets 508 to detect outliers, which can then be removed from the data set and/or flagged for manual review by a user. In some embodiments, outlier detector 502 performs outlier detection on each data set at a regular interval or on demand, such as prior to utilizing the data set to generate and/or update an asset model.

In some cases, traditional outlier detection methods can unsuspectedly remove "good" or relevant data from a data set. For example, some data points may be identified as outliers, but are actually a legitimate result. To overcome this issue, outlier detector 502 may compare the outliers to a set of boundaries, which can include a minimum and maximum allowable value (i.e., a lower and upper threshold) for data points of the data set. Advantageously, outlier detector 502 may be configured to intelligently select and/or adjust the lower and upper thresholds for outlier detection based on the data being analyzed. In this manner, data points that are flagged as outliers but that are within the lower and upper thresholds may be unflagged and/or left in the data set.

In some embodiments, lower and upper thresholds are defined by a user, and in other embodiments the lower and upper thresholds are established automatically by outlier detector 502. In some embodiments, lower and upper thresholds for outlier detection are predefined for different types of assets and/or data sets. For example, lower and upper thresholds may be defined based on the particular type, capacity, model, etc., of equipment associated with a data set, or the lower and upper thresholds are defined based on the data within the data set.

In some embodiments, the lower and upper thresholds are defined based on technical specifications or parameters of the equipment associated with the data sets. A chiller, for example, may have a predefined (e.g., by the manufacturer) minimum and maximum accepted inlet chilled water and condenser water temperatures. In this example, a lower threshold may be defined as:

$$t_{min} = T_{min} \times s$$

where $t_{min}$ is the lower threshold value, $T_{min}$ is the minimum inlet/condenser water temperature, and s is a safety value. Likewise, an upper threshold may be defined as:

$$t_{max} = T_{max} \times s$$

where $t_{max}$ is the upper threshold value, $T_{max}$ is the maximum inlet/condenser water temperature, and s is the safety value. In some embodiments, the safety value is predefined (e.g., by a user) and/or may be automatically selected based on the type of asset or data set. For example, a safety value of 0.8 may be used for chillers.

In some embodiments, the lower and upper thresholds are defined based on ambient physical constraints, such as outdoor air temperature. For example, a minimum and maximum recorded air temperature for a location associated with an asset or central plant may be considered when establishing the lower and upper thresholds. In some embodiments, a minimum and maximum recorded air temperature for the plant may be considered. For example, the lowest temperature recorded on Earth (e.g., in Vostok, Antarctica) is −89.2° C. while the highest temperature recorded on Earth (e.g., in Death Valley) is 54° C. Accordingly, a lower threshold for a particular asset may be set to −89.2° C. while an upper threshold is set to 54° C.

In some embodiments, the lower and upper thresholds are defined based on physical relationships between assets or between parameters of an asset. Using a chiller as an example, a lower threshold can be defined for a minimum condenser water output temperature $CWT_{min}^{out}$. In this example, known values (e.g., from manufacturer data and/or measurements) can include a minimum heat flow rate at the condenser $CWQ_{min}$, a maximum condenser water mass flow rate $CW\dot{m}_{max}$ and a minimum condenser water inlet temperature $CWT_{min}^{in}$. The values can be inserted into an energy equation to solve for $CWT_{min}^{out}$, as shown below.

$$\dot{Q} = \dot{m} \times Cp \times \Delta T$$

$$CW\Delta T_{min} = \frac{CWQ_{min}}{CW\dot{m}_{max} \times Cp_{water}}$$

$$CWT_{out} = \left(CWT_{min}^{in} + CW\Delta T_{min}\right) \times s$$

where s is again a safety factor of, for example, 0.8 for chillers.

Still referring to FIG. 5, model engine 418 is also shown to include a model generator 504 for generating and/or modifying asset models. In particular, model generator 504 may be configured to generate new asset models as described in U.S. patent application Ser. No. 16/549,931, filed Aug. 23, 2019, which is incorporated herein by reference in its entirety. Model generator 504 may also be configured to update any of asset models 420 based on operational data stored in data sets 508. In some embodiments, model generator 504 updates asset models 420 using data sets 508 that have been analyzed by outlier detector 502, as described above, to remove outliers. In some embodiments, model generator 504 stores updated models in asset models 420 for retrieval/use by low level optimizer 432. Additional features of model generator 504 are described in greater detail below with respect to FIGS. 9 and 11.

Model engine 418 is also shown to include a derating engine 506 configured to derate asset models 420 and/or subplant curves. In some embodiments, derating engine 506 may also be configured to generate curves for individual assets, as described below with respect to FIGS. 8A-8F. Accordingly, it will be appreciated that derating engine 506 may communicate directly with low level optimizer 432 and/or low level optimizer 432 may receive individual asset curves from derating engine 506 to generate subplant curves.

In particular, derating engine 506 may be configured to analyze data sets 508 with respect to subplant curves and/or asset models 420 in order to determine a degradation factor for an asset. The degradation factor may indicate, for a particular asset, a difference between expected values or parameters for the asset and actual, measured values. For example, operational data stored in data sets 508 for an asset may be compared to an expected curve or expected data for the asset to determine a percentage difference between the actual and expected values. In some embodiments, the expected values are represented as a design curve, as will be described in greater detail below, that is generated based on design or manufacturer provided asset parameters (e.g., designed capacity, energy consumption, etc.). Additional features of derating engine 506 are described in greater detail below with respect to FIGS. 9 and 11.

Model Adaptation

Figure 6:
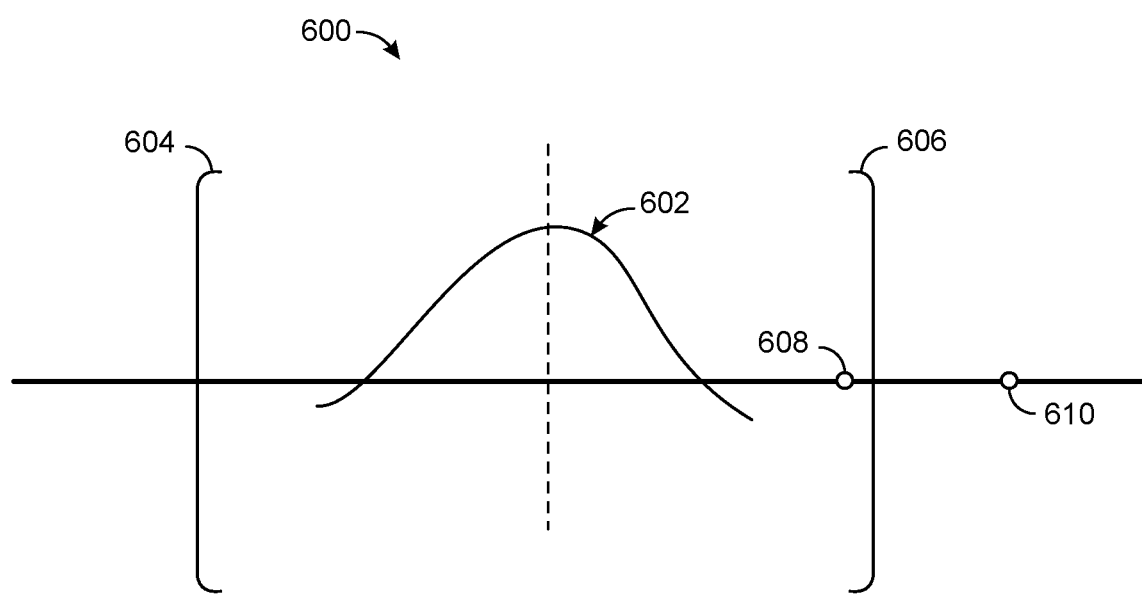
FIG. 6 is an example graph illustrating outlier detection with intelligent thresholds, according to some embodiments.

Referring now to FIG. 6, an example graph 600 illustrating outlier detection with intelligent thresholds is shown, according to some embodiments. In particular, a bell curve 602 is shown on graph 600 that may represent a data set, individual data points, and/or a distribution of data points. For example, the data points in a data set (e.g., one of data sets 508) may follow a normal distribution when plotted on graph 600, resulting in bell curve 602. Graph 600 is shown to include a lower threshold 604 (i.e., lower bound) and an upper threshold 606 (i.e., upper bound) that generally surround the data points that define bell curve 602. Graph 600 also includes two outlier data points 608 and 610. In this case, outlier data point 610 is outside of lower threshold 604 and upper threshold 606; specifically, outlier data points 610 exceeds upper threshold 606.

As described above, outlier detector 502 may implement any number of different techniques for detecting outliers such as outlier data points 608 and 610. When outliers are detected, outlier detector 502 may compare the outlier data points 608 and 610 to lower threshold 604 and upper threshold 606. In this example, outlier detector 502 may determine that outlier data point 608 is within the lower threshold 604 and upper threshold 606, even though outlier data point 608 does not "fit" with the data of bell curve 602. Outlier data point 610 may still be removed from the data set since it falls outside of upper threshold 606. However, in some embodiments, outlier detector 502 may be configured to adjust one or more of lower threshold 604 and upper threshold 606 to encompass outlier data point 610, thereby retaining outlier data point 610 within the data set. Alternatively, lower threshold 604 and/or upper threshold 606 such that outlier data point 608 is excluded from the data set.

Figure 7:
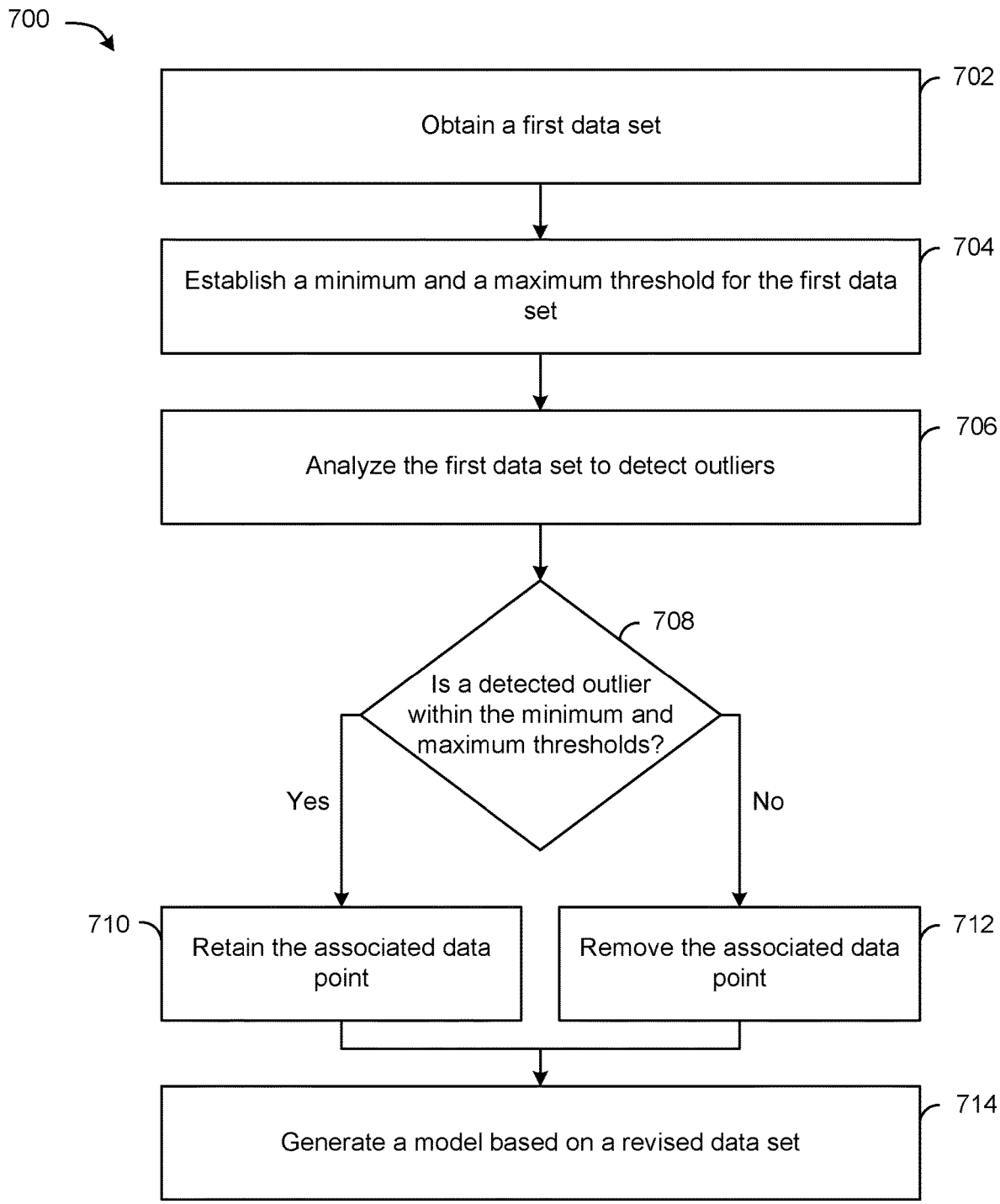
FIG. 7 is a flow chart of a process for adjusting outlier detection thresholds, according to some embodiments.

Referring now to FIG. 7, a flow chart of a process 700 for adjusting outlier detection thresholds is shown, according to some embodiments. Process 700 may be implemented by outlier detector 502, or more generally by central plant controller 402, for example. As briefly described above, some outlier detection methods can remove relevant data from a data set which may not truly be an outlier, or that may be desirable to retain in the data set to provide more accurate results (e.g., when generating asset models 420). Thus, by implementing process 700, outlier detector 502 can adjust minimum (i.e., lower) and maximum (i.e., upper) thresholds for outlier detection to account for the data set being analyzed (e.g., based on the type of asset). It will be appreciated that certain steps of process 700 may be optional and, in some embodiments, process 700 may be implemented using less than all of the steps.

At step 702, a first data set is obtained. In some embodiments, the first data set is a historical data set including operating data for a central plant asset, such as a chiller, a cooling tower, a boiler, a heater, a steam generator, an air handling unit, a rooftop unit, etc. The operating data can include any data relating to the operations of the asset, such as sensor values (e.g., speeds, temperatures, pressures, etc.), setpoints, schedules, on/off decisions, etc. In some such embodiments, operating data for the asset may be collected over time, such as by BMS controller 366 or central plant controller 402, and stored in a database. For example, BMS controller 366 or central plant controller 402 may receive sensor data or other feedback from the asset, and may record control decisions that are sent to the asset, all of which may be stored in a data set associated with the asset. In other embodiments, a data set may be received from another source, such as a remote system, via user input, etc.

At step 704, a minimum and maximum threshold for the first data set may be defined. As described above with respect to FIG. 5, for example, outlier detector 502 may automatically defined the minimum and maximum thresholds for a data set, such as based on parameters of the asset associated with the data set (e.g., type, capacity, model number, etc.). In some embodiments, the minimum and maximum thresholds are predefined by a user or another system. As described in greater detail above, in some embodiments, the lower and upper thresholds are defined based on technical specifications or parameters of the equipment associated with the data sets. In some embodiments, the lower and upper thresholds are defined based on ambient physical constraints, such as outdoor air temperature. In some embodiments, the lower and upper thresholds are defined based on physical relationships between assets or between parameters of an asset.

At step 706, the first data set is analyzed to detect outliers. For example, outlier detector 502 may use any type of outlier detection technique including, but not limited to, z-score, density-based spatial clustering of applications with noise (DBSCAN), linear regressions, isolation trees, etc. If an outlier or multiple outliers are detected after analyzing the data set, then at step 708 the outlier(s) can be compared to the minimum and maximum thresholds defined above. If the outlier(s) are determined to be within the minimum and maximum thresholds, the outlier may be retained in the data set (step 710). If the outlier(s) are determined to be outside of the the minimum and maximum thresholds, the outlier may be removed from the data set and/or flagged for review (step 712).

At step 714, the revised data set (e.g., including or excluding one or more outliers) is used to generate an asset model; although, it will be appreciated that the revised data set may also be stored for future model generation or for other used by central plant controller 402. As described above, for example, model generator 504 may utilized the revised data set to generate a model of an asset (e.g., the asset associated with the data set) that represents operations of the model, and that can be used to simulate or predict asset operations. In some embodiments, the revised data set may be transmitted to other systems (e.g., remote systems) for additional processing, or to be used for other tasks, such as evaluating asset performance. In some embodiments, the revised data set may be presented to a user via a user interface.

Referring now to FIGS. 8A-8F, example graphs illustrating equipment model adaptation by adjusting a model design curve are shown, according to some embodiments. As briefly described above, a design curve may be a representation of asset performance that is generated based on expected or known asset parameters, such as asset parameters provided by a manufacturer of the asset. More specifically, a design curve may represent a relationship between a resource consumed by the asset and a resource produced by the asset. In some embodiments, the design parameters are determined by manufacturer data, experimental data, estimations, or by other methods.

Figure 8A:
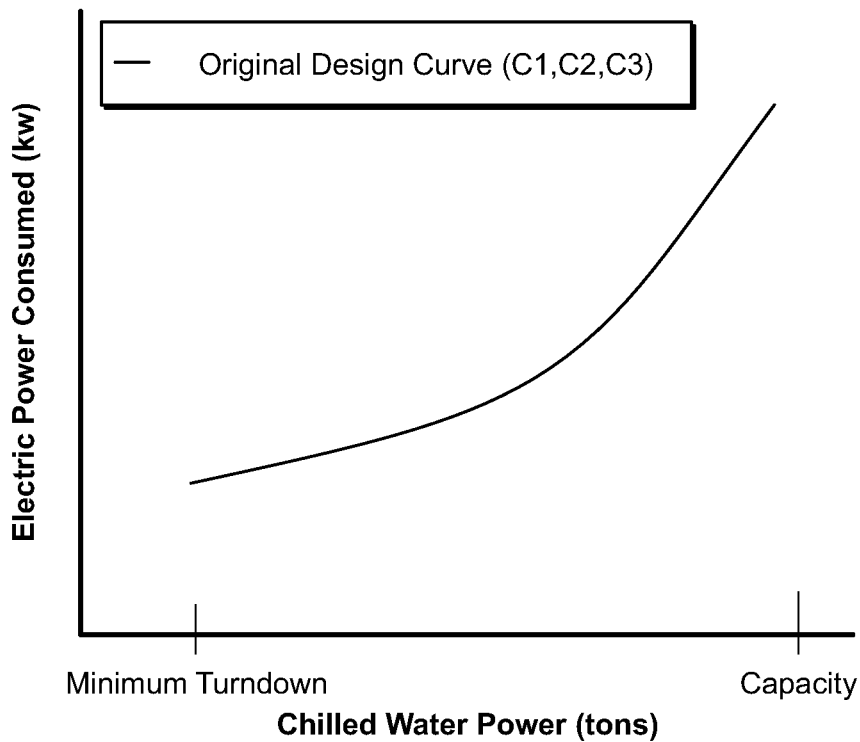
FIGS. 8A-8F are example graphs illustrating asset model adaptation by adjusting a model design curve, according to some embodiments.

Turning first to FIG. 8A, a design curve for a chiller asset (e.g., chiller 102) is shown, according to some embodiments. This design curve defines a relationship between electrical power consumed (e.g., in kW) and chilled water produced (e.g., in tons) based on design parameters of the chiller (e.g., capacity, energy usage, efficiency, etc.). For example, the design curve illustrates that, for this particular chiller, electrical power consumed increases exponentially as chilled water production reaches a capacity for the chiller (e.g., a maximum tonnage). In some embodiments, the design curve is generated by low level optimizer 432 based on an asset model, such as the Gordon-Ng model described above. In some such embodiments, the design curve is generated using coefficients $c_1$, $c_2$, $c_3$ that are solved by regression.

Figure 8B:
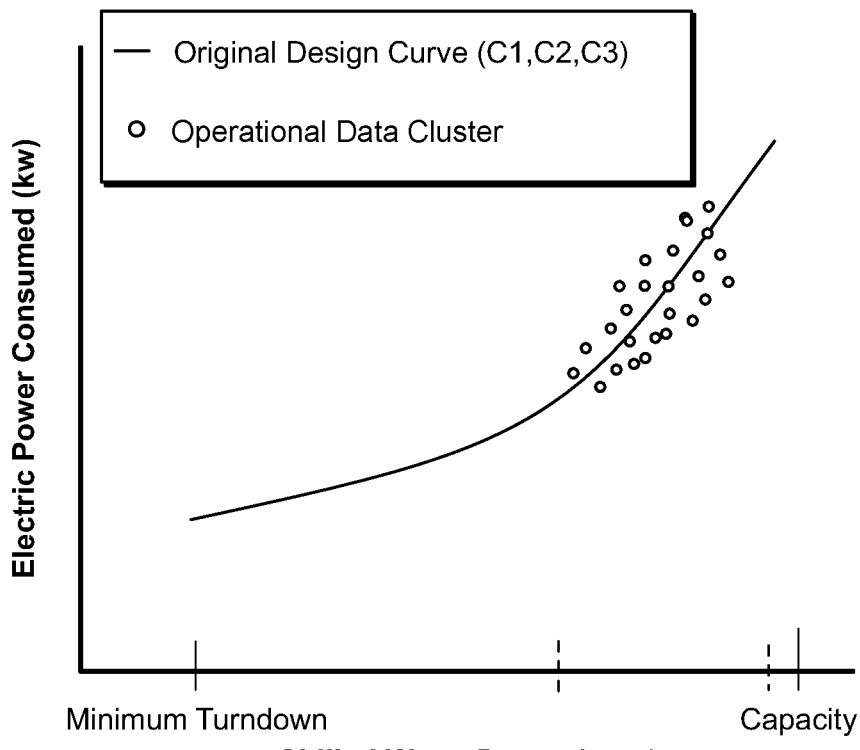

In FIG. 8B, operational data is shown as an overlay to the design curve. The operational data can include any number of data points collected from the chiller (e.g., by sensors, etc.) while the chiller is operating. In this example, the data points represent an amount of electrical power consumed with respect to an amount of chilled water produced. It is not uncommon for operational data to be collected only in a portion of an asset's operating range, as it can be seen in FIG. 8B. Specifically, the asset (e.g., chiller) may generally be operated only in a particular range, such as to maximize efficiency or to meet load requirements. In this example, the operational data is clustered in only a portion of the graph (i.e., a "trustworthy" zone), indicated by two additional marks along the x-axis of the graph, leaving a largely unrepresented region of data extending to a minimum turndown (MTD) value of the chiller. Accordingly, it can be determined that this chiller generally operates in the upper-end of its designed capacity.

Figure 8C:
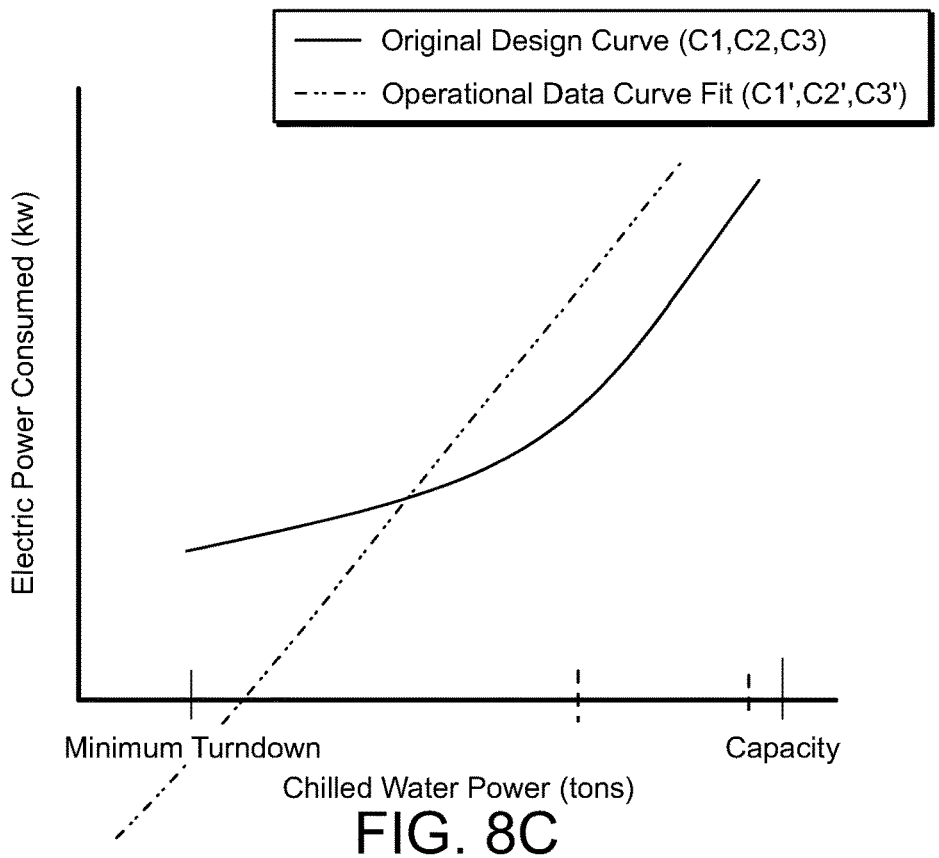

Due to a lack of operational data throughout the complete potential operating region of the chiller, it may be desirable to extrapolate an operational data curve through the full operating region. For example, low level optimizer 432 may use the operational data to extrapolate an operational data curve for the chiller based on the operating data. However, as shown in FIG. 8C, directly extrapolating an operational data curve using the operational data may yield unintended and undesirable results. In this example, the extrapolated operational curve indicated that negative power is provided by the chiller (i.e., power is generated) in lower portions of the chiller's operating range, which may be considered an impossible result. Accordingly, it may be desirable to generate an operational data curve in another manner.

Figure 8D:
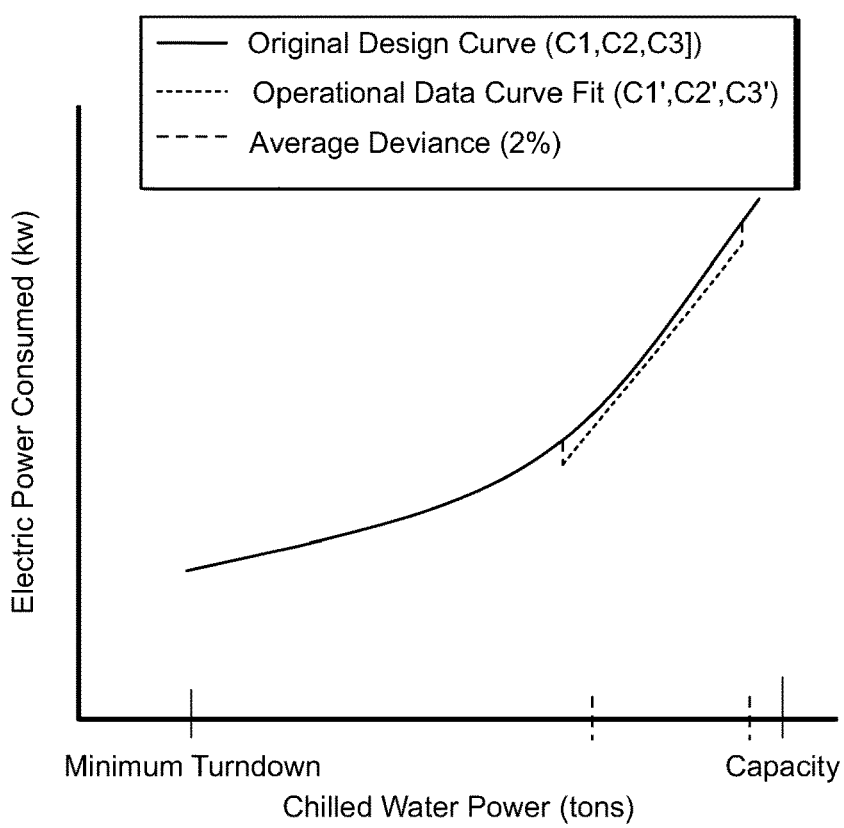

As shown in FIG. 8D, a method for generating an operational data curve that avoids the issues described above can be implemented (e.g., by central plant controller 402) by first generating an intermediate data curve within the trustworthy zone (e.g., defined by two hash marks on the x-axis of the graph) associated with the operational data. For example, the trustworthy zone may be between a minimum and maximum operational data point. The intermediate data curve can be generated by any suitable technique, such as regression, to extrapolate the operational data within the trustworthy zone. Subsequently, the intermediate data curve can be compared to the design curve to determine an average deviance between the curves. In the example shown, the average deviance is represented as a percentage difference, in this case 2%.

Figure 8E:
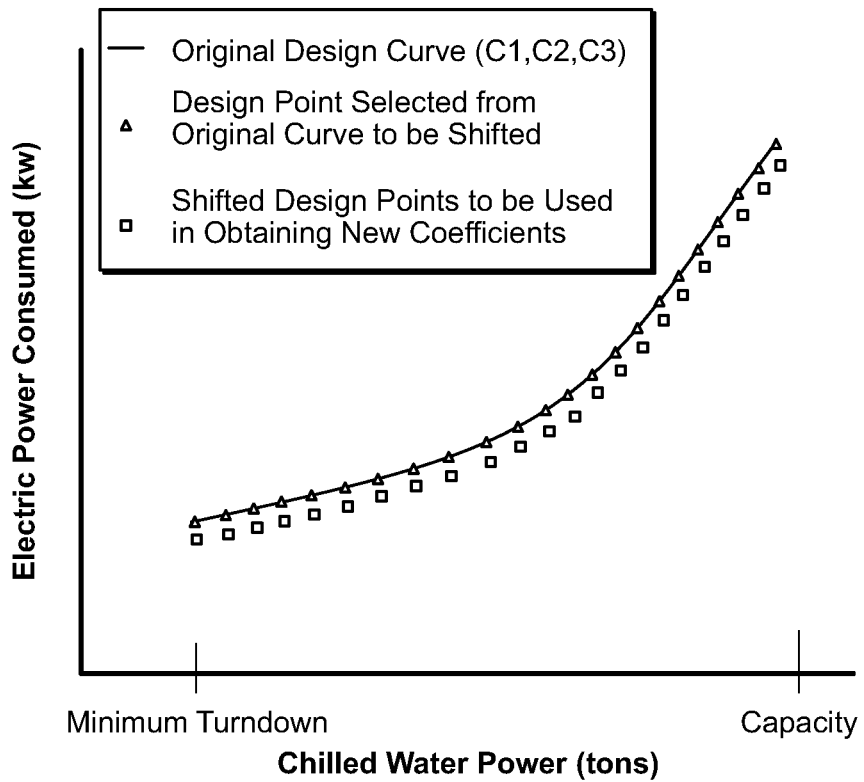
Figure 8F:
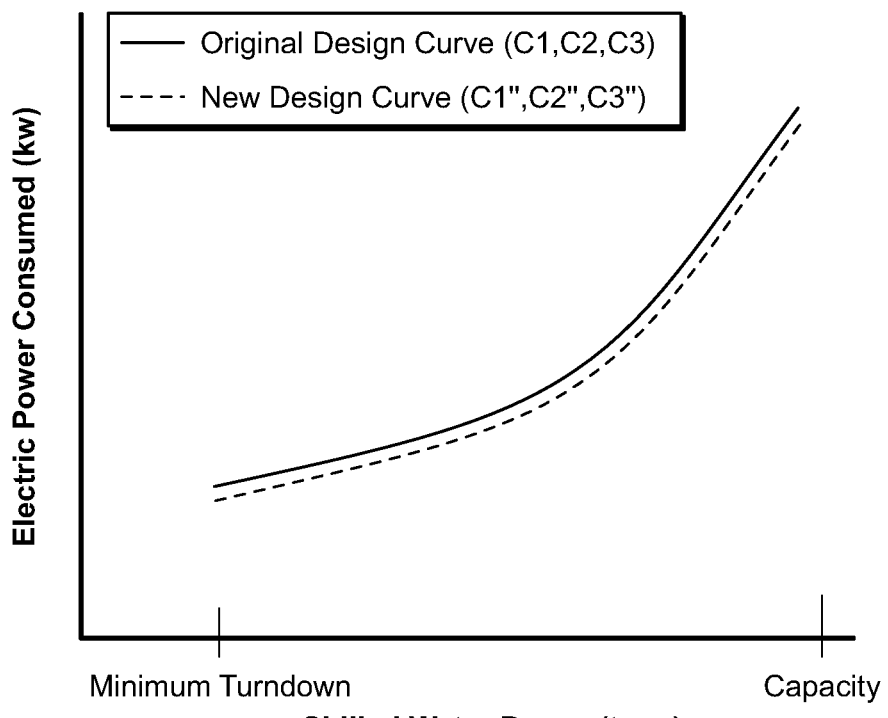

In some embodiments, the average deviance is used as a degradation factor to generate a new operational curve for the asset. As shown in FIG. 8E, for example, a number of points along the original design curve can be selected or identified and used to generate shifted data points. In particular, the shifted data points may be derated from the original data points based on the degradation factor. In this example, the shifted data points are shifted down (e.g., along the y-axis) by 2%. These shifted data points, or sample points, may then be regressed to generate a new design curve, also referred to as an operational curve, as shown in FIG. 8F.

Figure 9:
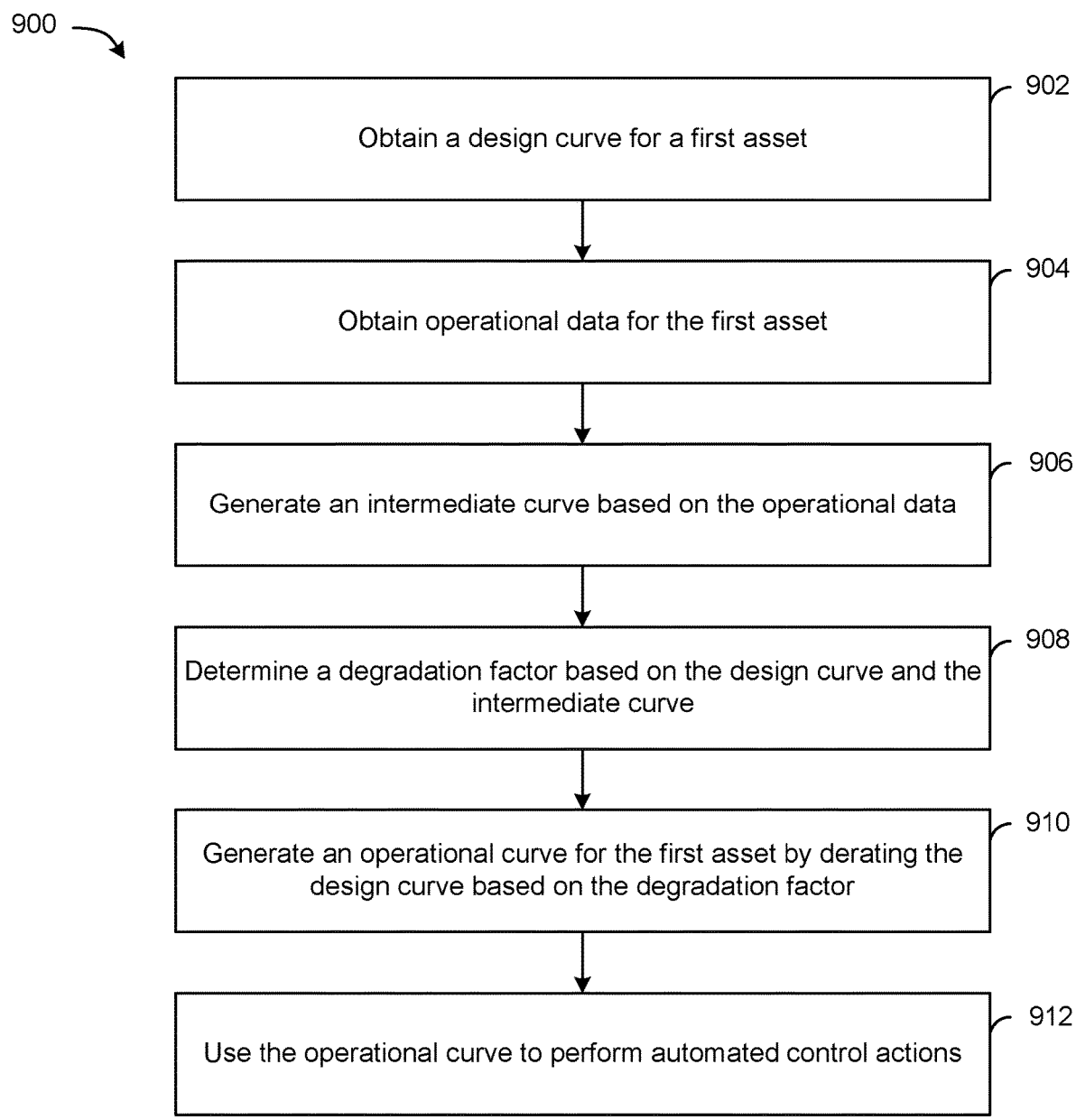
FIG. 9 is a flow chart of a process for adjusting a model design curve, according to some embodiments.

Referring now to FIG. 9, a flow chart of a process for adjusting a model design curve is shown, according to some embodiments. Process 900 may be implemented by model engine 418, or more generally by central plant controller 402, for example. As briefly described above, asset models can be used to generate (e.g., using regression methods) design or operational curves for central plant assets. In some embodiments, design curves can be generated based on original design data and parameters (e.g., from a manufacturer) for an asset, and can later be updated based on operating data (e.g., collected by central plant controller 402).

Advantageously, updating design curves for these central plant assets using operational data can improve the design curves by according for degradation of asset performance. However, in some cases, assets may operate only in a narrow portion of their maximum potential operating range during times when operating data is obtained. For example, a chiller may have a MTD of 1000 tons and a capacity of 3000 tons, but operational data obtained for the chiller may only be collected between 2000 and 2500 tons. Simply extrapolating this data to generate an operational curve can result in an undesirable fit, as described above with respect to FIG. 8C. Accordingly, process 900 may generate operational curves based on design curves in combination with operational data to provide more accurate asset models and predictions with minimal user input. It will be appreciated that certain steps of process 900 may be optional and, in some embodiments, process 900 may be implemented using less than all of the steps.

At step 902, a design curve for a first asset is obtained. As described above, a design curve may be a representation of asset performance that is generated based on expected or known asset parameters to define a relationship between a resource consumed and a resource produced. In some embodiments, a design curve is first generated using a model of the first asset (e.g., one of asset models 420). For example, an asset model may be retrieved from a database and executed by low level optimizer 432 to generate the design curve. In other embodiments, a pre-generated design curve is obtained from a database or via a user input. In some embodiments, a design curve is obtained for a subplant associated with the first asset, rather than for the first asset itself. In some embodiments, the design curve is defined by set of coefficients $c_1$, $c_2$, $c_3$, which can be associated with a corresponding asset model as described above.

At step 904, operational data for the first asset is obtained. As described above, operational data can include any data relating to the operation of an asset in real-time or based on data collected over a time period. For example, operational data can include setpoints, schedules, time periods when the asset was on or off, maintenance information, alarm data, etc. In some embodiments, the operational data is collected by central plant controller 402 and stored in a databased, or is received by central plant controller 402 from BMS controller 366. In any case, the operational data may include a plurality of data points that indicate how the first asset performed at various time periods. For example, operational data for a chiller may indicate an amount of electrical power consumed and an amount of chilled water produced at one or more time periods. In some embodiments, the operational data is cleaned by performing intelligent outlier detection, as described above with respect to FIG. 7.

At step 906, an intermediate curve is generated based on the operational data. In some embodiments, the intermediate curve is generated by performing a regression of the data points in the operational data set to generate a curve, as shown in FIG. 8D. In some embodiments, performing the regression yields a modified set of coefficients $c_1'$, $c_2'$, $c_3'$ that define the intermediate curve. In some embodiments, the intermediate data curve is generated from data points within a trustworthy zone. The trustworthy zone may be defined by a lower and/or an upper threshold. In some embodiments, the trustworthy zone is predefined, such as by a user. In other embodiments, the trustworthy zone is automatically defined based on the operational data set. For example, a lower threshold of the trustworthy zone may be defined based on the left-most data point along the x-axis.

At step 908, a degradation factor is determined based on the design curve and the intermediate curve. In some embodiments, the design curve may be compared to the intermediate curve to determine an average deviance between the two curves. In some embodiments, the average deviance is determined only within the trustworthy zone. In some embodiments, rather than comparing the intermediate curve to the design curve, each data point of the operational data set within the trustworthy zone is compared to the design curve to determine the average deviance. In some embodiments, the average deviance is represented as a penalty score (e.g., 0.02) or as a percentage (e.g., 2%). In particular, the degradation factor may be the average deviance represented as a percentage.

At step 910, an operational curve is generated by derating the design curve based on the degradation factor. Specifically, any number of data points along the design curve may be identified (i.e., selected) to generate a plurality of shifted data points. With a chiller, for example, the selected data points may include a point along the design curve at every 100 tons of chilled water, every 50 tons, etc., as shown in FIG. 8E. Each of the identified data points may be derated from based on/by the degradation factor to generate the plurality of shifted data points. For example, the identified data points may be shifted down (e.g., along the y-axis) by multiplying a value of each point by the degradation factor. The shifted data points, or sample points, may then be used to perform a regression to generate the operational curve, as shown in FIG. 8F. In some embodiments, the regression yields another modified set of coefficients $c_1''$, $c_2''$, $c_3''$ that define the operational curve, and that may be utilized in an associated asset or subplant model.

At step 912, the operational curve is used to perform automated control actions. In particular, the operational curve may be used to generate subplant and/or central plant control decisions, such as setpoints, on/off decisions, etc. In some embodiments, the operational curve is transmitted (e.g., by low level optimizer 432) to high level optimizer 432 for generating subplant loads and/or utilized by low level optimizer 432 to generate on/off decisions. In some embodiments, the operational curve is used to generate setpoints at one or more time intervals for one or more assets or subplants, and the one or more assets or subplants are controlled to meet those setpoints. In some embodiments, at step 912, the operational curve is stored in a database. In some embodiments, the operational curve is transmitted to another device or system (e.g., a server, a user interface, etc.) for additional processing, simulation, viewing, etc.

Referring now to FIGS. 10A-10D, example graphs illustrating asset model adaptation by subplant groupings are shown, according to some embodiments. As described in greater detail below, in some cases, operational data may only be obtain for a small portion of an operating range of an asset, which can result in inaccurate operational curves if the operational data is merely extrapolated into a curve. Additionally, it may be possible that the operational data collected for an asset is inaccurate due to sensor malfunctions, poor sampling rates, external factors, etc., or it may be the case that a complete set of operational data is not available for a particular asset (e.g., the asset is new and has not been operated). In these cases, it may be advantageous to generate individual asset models based on known good data, such as a subplant curve.

Figure 10A:
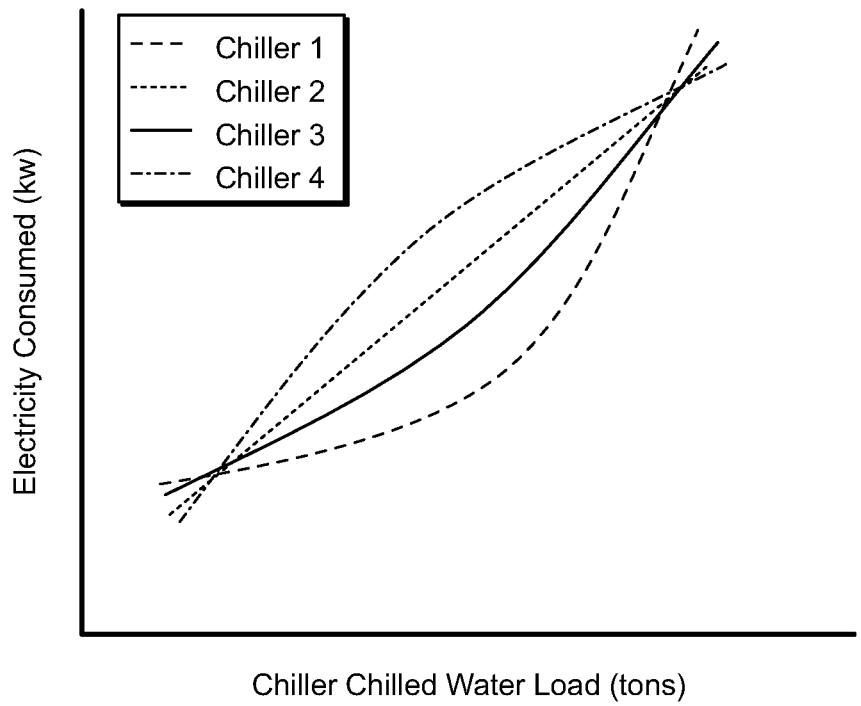
FIGS. 10A-10D are example graphs illustrating asset model adaptation by subplant groupings, according to some embodiments.

Turning first to FIG. 10A, a plurality of operational curves are shown that were generated from inaccurate or poor asset models. In this example, all four assets may be the same make/model of equipment (e.g., chillers), but the operational curves are noticeably different. In some cases, areas where operational curves for different assets cross (i.e., crossing points) encourage the optimization processes performed by central plant controller 402 to switch assets (e.g., turn one asset on and another off) to reduce power consumption.

Thus, it is not ideal to have a plurality of crossing points for similar asset, which can lead to repeated switching of assets and subsequently decreased efficiency (e.g., due to asset warm-up times).

Figure 10B:
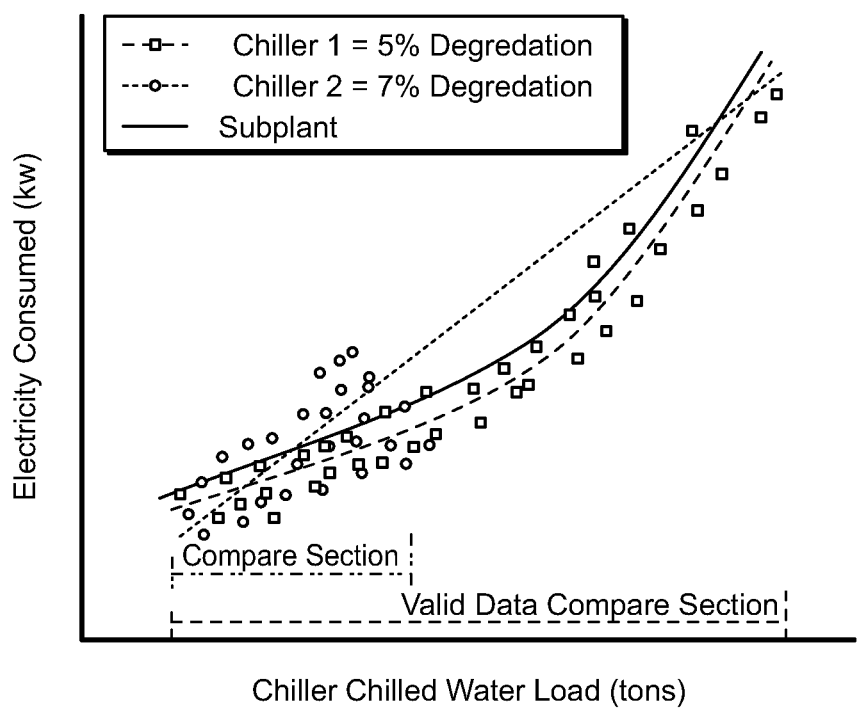

To resolve these problems, operational data may be obtained (e.g., collected) for one or more assets and used to determine a degradation factor. FIG. 10B, for example, includes a subplant design curve and a plurality of data points associated with two different asset, in this case, chillers. It is shown that operational data points have been collected across the entire operating range for one of the asset, thus a relatively accurate operational curve can be generated for this asset by extrapolating the operational data. However, data was only collected over a small portion of the operating range of the other asset. Extrapolating this smaller set of operational data yields an undesirable operational curve. Accordingly, operational data may be limited to data points within a valid comparison section. The comparison section may be defined by a lower and/or upper threshold, which may be determined based on the data points of the operational data sets.

After identifying the operational data within the comparison section for each asset, the operational data may be compared to the subplant curve to determine an average deviance. In some embodiments, the average deviance is determined by comparing each data point of an operational data set to the subplant curve. In some embodiments, the average deviance is determined by generating an intermediate curve based on the operational data within the comparison section (e.g., by performing a regression) and comparing the intermediate curve(s) to the subplant curve. In any case, a degradation factor may be determined for each asset by representing the average deviance as a percentage.

Figure 10C:
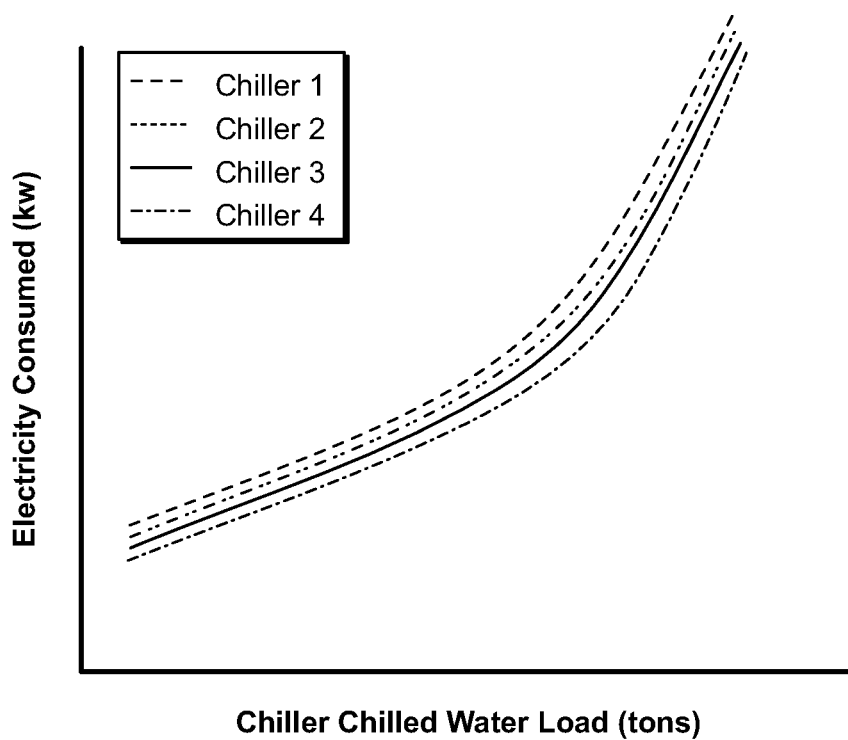
Figure 10D:
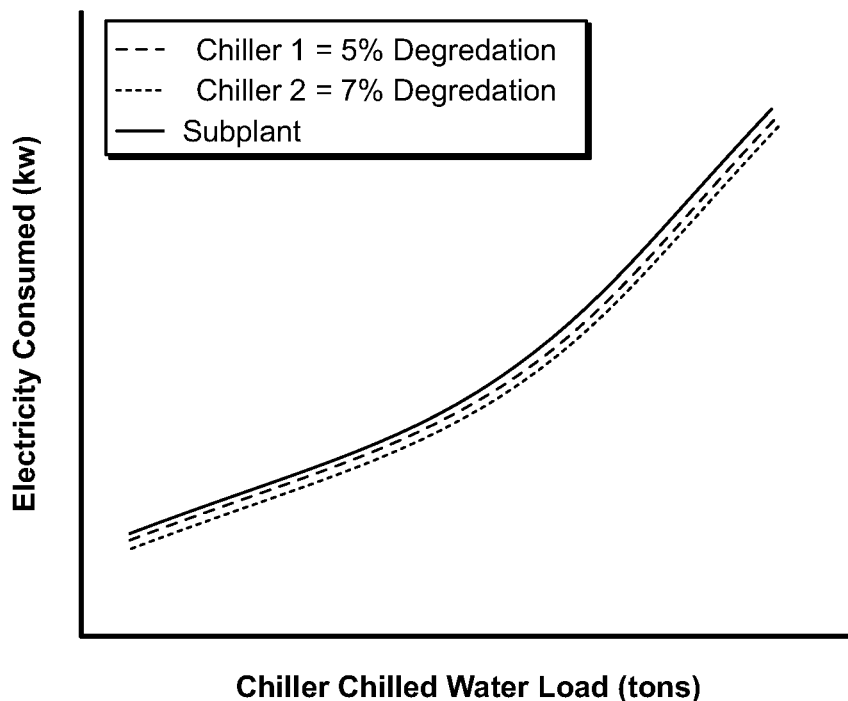

To generate an operational curve for each asset, the subplant curve may be derated based on the degradation factor. Specifically, the subplant curve may be adjust up or down (e.g., on the y-axis) by the degradation factor, as shown in FIG. 10C. In some embodiments, this operation is performed by selecting a plurality of data points along the subplant curve and multiplying each data point by the degradation factor, then performing a regression on the adjusted data points to generate an operational curve. In this manner, operational data curves can be generated for each individual asset of a subplant based on the subplant curve as shown in FIG. 10D.

Figure 11:
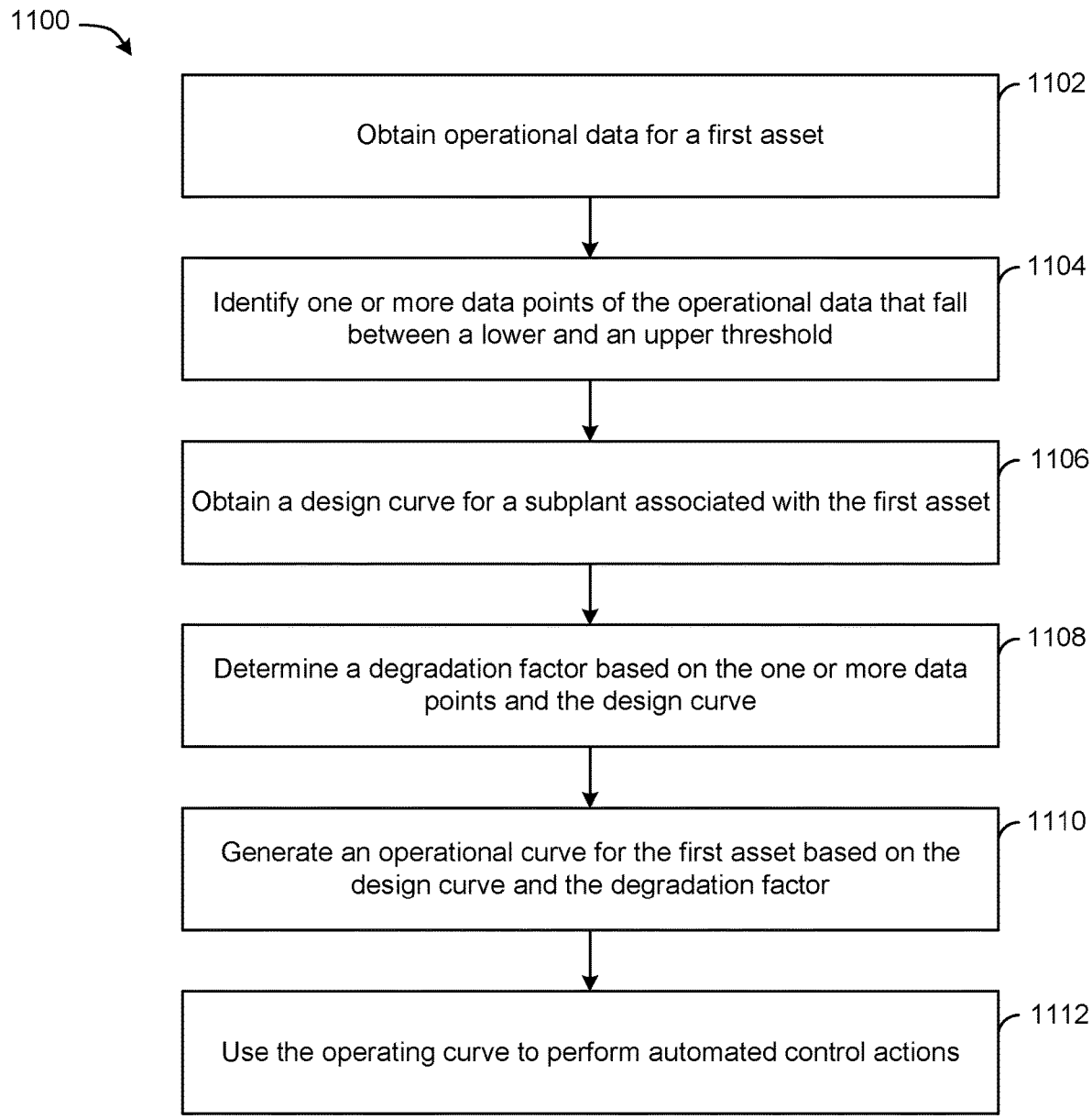
FIG. 11 is a flow chart of a process for adjusting a model design curve based on subplant groupings, according to some embodiments.

Referring now to FIG. 11, a flow chart of a process for adjusting a model design curve based on subplant groupings is shown, according to some embodiments. Process 1100 may be implemented by model engine 418, or more generally by central plant controller 402, for example. In some cases, it may be beneficial to generate operational curves for each asset in a central plant or subplant based on each asset's own operational data, to show differentiation between asset performance (e.g., which asset is the most efficient to reducing operating costs). However, generating individual operational curves can, in some cases, lead to multiple "crossing points" of operational curves, as described above with respect to FIG. 10A, which can lead to undesirable control decisions (e.g., switching between equipment, operating less efficient equipment, etc.). In some embodiments, data from first asset may be collected at higher operating points than data from a second asset, which can result in these undesirable operational curves. Process 1100 addresses these issues by utilizing subplant data as a whole to generate operational curves for individual assets within the subplant. Data from individual assets can be used to derate design curves to yield operational curves representative of individual asset performance. It will be appreciated that certain steps of process 1100 may be optional and, in some embodiments, process 1100 may be implemented using less than all of the steps.

At step 1102, operational data is obtained for the first asset. As described above, operational data can include any data relating to the operation of an asset in real-time or based on data collected over a time period. For example, operational data can include setpoints, schedules, time periods when the asset was on or off, maintenance information, alarm data, etc. In some embodiments, the operational data is collected by central plant controller 402 and stored in a databased, or is received by central plant controller 402 from BMS controller 366. In any case, the operational data may include a plurality of data points that indicate how the first asset performed at various time periods. For example, operational data for a chiller may indicate an amount of electrical power consumed and an amount of chilled water produced at one or more time periods.

At step 1104, one or more data points that fall between a lower and upper threshold are identified. These lower and upper thresholds may define a comparison zone of valid data points for subsequently determining a degradation factor. In some embodiments, the thresholds of the comparison zone are predefined; however, in other embodiments, the thresholds are determined based on the operational data obtained at step 1102. For example, the comparison zone may be defined based on the left-most and right-most data points along the x-axis of a graph, as shown in FIG. 10B. Limiting the data points to those within the comparison zone can prevent poor or undesirable operational curves in subsequent steps, as also shown in FIG. 10B.

At step 1106, a design curve is obtained for a subplant associated with the first asset. Much like a design curve for an individual asset, a design curve for a subplant may be a representation of subplant performance that is generated based on expected or known asset parameters to define a relationship between a resource consumed and a resource produced. In other words, the subplant design curve may account for models and/or design curves associated with one or more assets included in the subplant. In some embodiments, a design curve is first generated using a model of the subplant. For example, a subplant model, as described above, may define the performance of the subplant based on the assets associates with the subplant. In other embodiments, a pre-generated design curve is obtained from a database or via a user input.

At step 1108, a degradation factor is determined based on the one or more data points and the design curve for the subplant. In some embodiments, the design curve may be compared to each data point of the operational data set within the comparison zone to determine an average deviance. In some embodiments, the average deviance is represented as a penalty score (e.g., 0.02) or as a percentage (e.g., 2%). In particular, the degradation factor may be the average deviance represented as a percentage. In other embodiments, an intermediate curve for the operational data may be generated, as discussed above with respect to FIG. 9. In such embodiments, the degradation factor can be determined by comparing the design curve with the intermediate curve.

At step 1110, an operational curve is generated based on the design curve and the degradation factor. Specifically, any number of data points along the design curve may be identified (i.e., selected) to generate a plurality of shifted data points. Each of the identified data points may be derated from based on/by the degradation factor to generate the plurality of shifted data points. For example, the identified data points may be shifted down (e.g., along the y-axis) by multiplying a value of each point by the degradation factor. The shifted data points, or sample points, may then be used to perform a regression to generate the operational curve based on the design curve for the subplant.

At step 1112, the operational curve is used to perform automated control actions. In particular, the operational curve may be used to generate subplant and/or central plant control decisions, such as setpoints, on/off decisions, etc. In some embodiments, the operational curve is transmitted (e.g., by low level optimizer 432) to high level optimizer 432 for generating subplant loads and/or utilized by low level optimizer 432 to generate on/off decisions. In some embodiments, the operational curve is used to generate setpoints at one or more time intervals for one or more assets or subplants, and the one or more assets or subplants are controlled to meet those setpoints. In some embodiments, at step 1112, the operational curve is stored in a database. In some embodiments, the operational curve is transmitted to another device or system (e.g., a server, a user interface, etc.) for additional processing, simulation, viewing, etc.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A system for controlling a subplant comprising one or more assets, the system comprising:
   one or more memory devices having instructions stored thereon that, when executed by one or more processors, cause the one or more processors to perform operations comprising:
   generating a design curve for a first asset included in the subplant based on an asset model, the design curve comprising a plurality of data points that define an operation of the first asset;
   obtaining operational data for the first asset;
   determining a degradation factor for the first asset by comparing the design curve and the operational data;
   generating an operational curve for the first asset by derating the design curve based on the degradation factor; and
   operating the subplant based on the operational curve.

2. The system of claim 1, the operations further comprising generating an intermediate curve for the first asset based on the operational data, wherein the degradation factor is determined by comparing the design curve and the intermediate curve.

3. The system of claim 2, wherein determining the degradation factor comprises calculating an average deviance between the design curve and the intermediate curve, wherein the degradation factor is represented as a percent difference between the design curve and the intermediate curve based on the average deviance.

4. The system of claim 1, the operations further comprising determining one or more operating setpoints for the subplant based on the operational curve, wherein operating the subplant based on the operational curve comprises operating the subplant according to the one or more operating setpoints.

5. The system of claim 1, wherein the design curve for the first asset is a first design curve, the operations further comprising obtaining a second design curve for the subplant associated with the first asset, wherein determining the degradation factor for the first asset further comprises comparing the first design curve, the operational data, and the second design curve.

6. The system of claim 1, the operations further comprising filtering the operational data by removing any data points that fall outside of a threshold range.

7. The system of claim 1, wherein the design curve defines a relationship between an amount a first resource produced by the first asset and an amount of a second resource consumed by the first asset.

8. The system of claim 1, wherein the first asset is at least one of a chiller, a cooling tower, a boiler, a heater, a steam generator, an air handling unit, or a rooftop unit.

9. A method for controlling a subplant comprising one or more assets, the method comprising:
- generating a design curve for a first asset included in the subplant based on a model of the first asset, the design curve comprising a plurality of operating points that define an operation of the first asset;
- obtaining operational data for the first asset;
- determining a degradation factor for the first asset by comparing the design curve and the operational data;
- generating an operational curve for the first asset by derating the design curve based on the degradation factor; and
- operating the subplant based on the operational curve.

10. The method of claim 9, further comprising generating an intermediate curve for the first asset based on the operational data, wherein the degradation factor is determined by comparing the design curve and the intermediate curve.

11. The method of claim 10, wherein determining the degradation factor comprises calculating an average deviance between the design curve and the intermediate curve, wherein the degradation factor is represented as a percent difference between the design curve and the intermediate curve based on the average deviance.

12. The method of claim 9, further comprising determining one or more operating setpoints for the subplant based on the operational curve, wherein operating the subplant based on the operational curve comprises operating the subplant according to the one or more operating setpoints.

13. The method of claim 9, wherein the design curve for the first asset is a first design curve, the method further comprising obtaining a second design curve for the subplant associated with the first asset, wherein determining the degradation factor for the first asset further comprises comparing the first design curve, the operational data, and the second design curve.

14. The method of claim 9, further comprising filtering the operational data by removing any data points that fall outside of a threshold range.

15. The method of claim 9, wherein the design curve defines a relationship between an amount a first resource produced by the first asset and an amount of a second resource consumed by the first asset.

16. The method of claim 9, wherein the first asset is at least one of a chiller, a cooling tower, a boiler, a heater, a steam generator, an air handling unit, or a rooftop unit.

17. A non-transitory computer-readable medium comprising instructions stored thereon that, when executed by one or more processors, perform operations comprising:
- obtaining operating data for a first asset included in the subplant;
- obtaining a design curve of the subplant, the design curve comprising a plurality of operating points that define an operation of the subplant;
- determining a degradation factor for the first asset by comparing the operating data and the design curve;
- generating an operational curve for the first asset by derating the design curve based on the degradation factor; and
- operating the subplant based on the operational curve.

18. The computer-readable medium of claim 17, the operations further comprising generating an intermediate curve of the first asset based on the operational data, wherein the degradation factor is determined by comparing the intermediate curve and the design curve.

19. The computer-readable medium of claim 17, the operations further comprising determining one or more operating setpoints for the subplant based on the operational curve, wherein operating the subplant based on the operational curve comprises operating the subplant according to the one or more operating setpoints.

20. The computer-readable medium of claim 17, the operations further comprising filtering the operational data by removing any data points that fall outside of a threshold range.

* * * * *